United States Patent
Terakawa et al.

(10) Patent No.: US 11,031,034 B2
(45) Date of Patent: Jun. 8, 2021

(54) MAGNETIC RECORDING MEDIUM HAVING A RECORDING LAYER INCLUDING EPSILON-IRON OXIDE

(71) Applicant: Sony Corporation, Tokyo (JP)

(72) Inventors: Masaru Terakawa, Miyagi (JP); Yoichi Kanemaki, Miyagi (JP); Minoru Yamaga, Miyagi (JP)

(73) Assignee: Sony Corporation, Tokyo (JP)

(*) Notice: Subject to any disclaimer, the term of this patent is extended or adjusted under 35 U.S.C. 154(b) by 43 days.

(21) Appl. No.: 16/321,291

(22) PCT Filed: Nov. 17, 2017

(86) PCT No.: PCT/JP2017/041462
§ 371 (c)(1),
(2) Date: Jan. 28, 2019

(87) PCT Pub. No.: WO2018/116713
PCT Pub. Date: Jun. 28, 2018

(65) Prior Publication Data
US 2019/0295584 A1    Sep. 26, 2019

(30) Foreign Application Priority Data

Dec. 20, 2016 (JP) .............................. JP2016-246976
May 2, 2017 (JP) ................................. 2017-091760

(51) Int. Cl.
*G11B 5/706* (2006.01)
*G11B 5/712* (2006.01)
(Continued)

(52) U.S. Cl.
CPC ............ *G11B 5/70605* (2013.01); *G11B 5/70* (2013.01); *G11B 5/70642* (2013.01); *G11B 5/712* (2013.01); *G11B 5/714* (2013.01)

(58) Field of Classification Search
None
See application file for complete search history.

(56) References Cited

U.S. PATENT DOCUMENTS 10,204,651 B2 * 2/2019 Nakashio ........... G11B 5/70642
10,755,841 B2 * 8/2020 Terakawa .................. H01F 1/09
(Continued)

FOREIGN PATENT DOCUMENTS

JP     2002-298333 A    10/2002
JP     2009-099240 A     5/2009
(Continued)

OTHER PUBLICATIONS

Extended European Search Report dated Sep. 6, 2019 in corresponding European Application No. 17882856.2.

*Primary Examiner* — Kevin M Bernatz
(74) *Attorney, Agent, or Firm* — K&L Gates LLP

(57) ABSTRACT

A magnetic recording medium is used in a recording/reproduction apparatus having a shortest recording wavelength of not more than 75 nm, the magnetic recording medium including a recording layer that contains a powder of particles containing ε-iron oxide, in which a squareness ratio measured in a traveling direction of the magnetic recording medium is not more than 30%, a ratio ($D_{max}/D_{min}$) of an average longest diameter $D_{max}$ of the particles to an average shortest diameter $D_{min}$ of the particles satisfies a relationship of $1.0 \leq (D_{max}/D_{min}) \leq 1.1$, an average thickness $\delta_{mag}$ of the recording layer is not more than 100 nm, and a ratio ($\delta_{mag}/D_{min}$) of the average thickness $\delta_{mag}$ of the recording layer to the average shortest diameter $D_{min}$ of the particles satisfies a relationship of $\delta_{mag}/D_{min} \leq 5$.

12 Claims, 9 Drawing Sheets

(51) Int. Cl.
  *G11B 5/714*   (2006.01)
  *G11B 5/70*    (2006.01)

(56) References Cited

U.S. PATENT DOCUMENTS

| | | | |
|---|---|---|---|
| 2005/0111066 A1 | 5/2005 | Yun et al. | |
| 2011/0027588 A1* | 2/2011 | Hattori | B22F 1/025 |
| | | | 428/403 |
| 2014/0219069 A1* | 8/2014 | Hattori | G11B 5/73 |
| | | | 369/13.14 |
| 2014/0268414 A1* | 9/2014 | Nakashio | G11B 5/584 |
| | | | 360/110 |
| 2014/0314658 A1* | 10/2014 | Hattori | G11B 5/712 |
| | | | 423/594.2 |
| 2017/0069344 A1* | 3/2017 | Hosoya | G11B 5/7013 |
| 2017/0162220 A1* | 6/2017 | Nakashio | G11B 5/70642 |
| 2017/0221513 A1* | 8/2017 | Hiroi | G11B 5/70642 |
| 2018/0033528 A1* | 2/2018 | Sakane | H01F 1/11 |
| 2018/0358046 A1* | 12/2018 | Shirata | G11B 5/70642 |
| 2019/0362753 A1* | 11/2019 | Terakawa | G11B 5/714 |

FOREIGN PATENT DOCUMENTS

| | | |
|---|---|---|
| JP | 2002-373413 A | 12/2012 |
| JP | 2014-154178 A | 8/2014 |
| JP | 2016-135737 A | 7/2016 |
| WO | 2016/092744 A1 | 6/2016 |

* cited by examiner

MAGNETIC RECORDING MEDIUM HAVING A RECORDING LAYER INCLUDING EPSILON-IRON OXIDE

CROSS-REFERENCE TO RELATED APPLICATIONS

The present application claims the benefit of International Application No. PCT/JP2017/041462, filed Nov. 17, 2017, which claims priority to Japanese Application Nos. 2016-246976 filed Dec. 20, 2016, and 2017-091760 filed May 2, 2017, the disclosures of which are incorporated herein by reference.

BACKGROUND

The present technology relates to a magnetic recording medium.

For high recording density, it is effective to perform perpendicular recording by using a component perpendicular to a recording layer of the magnetic field generated from a recording head. In order to perform perpendicular recording, it is important to increase the degree of vertical orientation of a magnetic powder (i.e., reduce the degree of longitudinal orientation). Meanwhile, in the case of a magnetic tape, it is difficult to use a single magnetic pole head such as a hard disk medium as a recording head, and there is a high possibility that a ring-type head that has been used in the existing format will be used in the future as well.

As a magnetic powder of a perpendicular magnetic recording-type magnetic recording medium (hereinafter, referred to as "perpendicular magnetic recording medium"), a barium ferrite magnetic powder is used. However, since barium ferrite magnetic particles have a plate-like shape, stacking easily occurs. Here, "stacking" represents that magnetic particles having a plate-like shape are aggregated in such a way that the main surfaces thereof overlap with each other. In the case where stacking occurs, noise increases and the C/N (Carrier to Noise Ratio) value decreases. Therefore, it is desired to improve the C/N value in the perpendicular magnetic recording medium in which signals are recorded by using a ring-type head as a recording head.

In Patent Literatures 1 to 3, technologies for improving the C/N value by improving the dispersibility of the barium ferrite magnetic powder have been proposed.

SUMMARY

Technical Problem

It is an object of the present technology to provide a magnetic recording medium capable of improving the C/N value.

Solution to Problem

In order to solve the above-mentioned problem, the present technology is a magnetic recording medium that is used in a recording/reproduction apparatus having a shortest recording wavelength of not more than 75 nm, the magnetic recording medium including: a recording layer that contains a powder of particles containing ε-iron oxide, in which a squareness ratio measured in a traveling direction of the magnetic recording medium is not more than 30%, a ratio ($D_{max}/D_{min}$) of an average longest diameter $D_{max}$ of the particles to an average shortest diameter $D_{min}$ of the particles satisfies a relationship of $1.0 \leq (D_{max}/D_{min}) \leq 1.1$, an average thickness $\delta_{mag}$ of the recording layer is not more than 100 nm, and a ratio ($\delta_{mag}/D_{min}$) of the average thickness $\delta_{mag}$ of the recording layer to the average shortest diameter $D_{min}$ of the particles satisfies a relationship of $\delta_{mag}/D_{min} \leq 5$.

Advantageous Effects of Invention

In accordance with the present technology, it is possible to improve the C/N value of a magnetic recording medium. It should be noted that the effect described here is not necessarily limitative and may be any effect described in the present disclosure or an effect different from them.

DETAILED DESCRIPTION

Embodiments of the present technology will be described in the following order.
1 First Embodiment (Example of Magnetic Recording Medium)
2 Second Embodiment (Example of Magnetic Recording Medium)
3 Third Embodiment (Example of Magnetic Recording Medium)

1 First Embodiment

[Configuration of Magnetic Recording Medium]

A magnetic recording medium according to a first embodiment of the present technology is a perpendicular magnetic recording medium (perpendicular magnetic recording-type magnetic recording medium) configured to be capable of recording signals with the shortest recording wavelength of not more than 75 nm. More specifically, it is a perpendicular magnetic recording medium used in a recording/reproduction apparatus having the shortest recording wavelength of not more than 75 nm. The above-mentioned recording/reproduction apparatus includes a ring-type head as a recording head, and records signals in the magnetic recording medium by the ring-type head with the shortest recording wavelength of not more than 75 nm. Further, the magnetic recording medium has an elongated shape, and travels in the longitudinal direction at the time of recording/reproduction.

Figure 1:
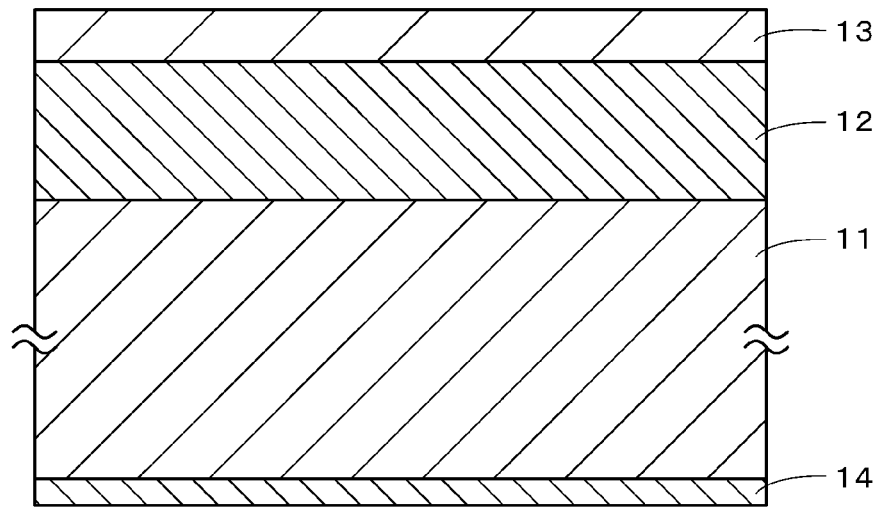
FIG. 1 is a cross-sectional view showing a configuration of a magnetic recording medium according to a first embodiment of the present technology.

As shown in FIG. 1, the magnetic recording medium includes an elongated substrate 11, an underlayer (nonmagnetic layer) 12 provided on one main surface of the substrate 11, and a recording layer (magnetic layer) 13 provided on the underlayer 12. The magnetic recording medium may further include a protective layer (not shown), a lubricant layer (not shown), and the like provided on the recording layer 13 as necessary. Further, as necessary, a backcoat layer 14 provided on the other main surface of the substrate 11 may be further included.

(Squareness Ratio)

A squareness ratio S measured in the travelling direction of the magnetic recording medium is favorably not more than 30%, and more favorably not more than 25%. In the case where the squareness ratio S exceeds 30%, since the vertical orientation of the magnetic powder is low, there is a possibility that the C/N value decreases.

The above-mentioned squareness ratio S is obtained as follows. First, the M-H loop of the entire magnetic recording medium is measured in the travelling direction (longitudinal direction) of the magnetic recording medium by using a vibrating sample magnetometer (VSM). Next, coating films (the underlayer 12, the recording layer 13, and the like) are wiped using acetone and ethanol or the like to leave only the substrate 11, and the M-H loop of the substrate 11 is measured similarly in the travelling direction for background correction. After that, the M-H loop after the background correction is calculated by subtracting the M-H loop of the substrate 11 from the M-H loop of the entire magnetic recording medium. A saturation magnetization Ms (emu) and a residual magnetization Mr (emu) of the obtained M-H loop are substituted into the following formula to calculate the squareness ratio S (%). Note that the measurement of the M-H loop described above is performed at room temperature (23° C.).

$$\text{Squareness ratio } S(\%) = Mr/Ms \times 100$$

(Activation Volume)

An activation volume $V_{act}$ is favorably not more than 5000 nm$^3$, more favorably not more than 4000 nm$^3$, and still more favorably not more than 3000 nm$^3$. In the case where the activation volume $V_{act}$ it not more than 5000 nm$^3$, the bit inversion region can be steep and a more excellent C/N value can be obtained.

The above-mentioned activation volume $V_{act}$ is obtained by the following equation derived by Street and Woolley.

$$V_{act} (\text{nm}^3) = k_B \times T \times X_{irr}/(\mu_0 \times Ms \times S)$$

(in which $k_B$: Boltzmann constant (1.38×10$^{-23}$ J/K), T: temperature (K), $X_{irr}$: irreversible magnetic susceptibility, $\mu_0$: permeability of vacuum, S: magnetic viscosity coefficient, Ms: saturation magnetization (emu/cm3))

The irreversible magnetic susceptibility $X_{irr}$, saturation magnetization Ms, and magnetic viscosity coefficient S to be substituted into the above-mentioned formula are obtained using a vibrating sample magnetometer (VSM) as follows. Note that the measurement direction by the VSM is perpendicular to the recording surface of the magnetic recording medium. Further, the measurement by the VSM is performed at room temperature (23° C.) on a measurement sample cut out from the elongated magnetic recording medium.

(Irreversible Magnetic Susceptibility $X_{irr}$)

The irreversible magnetic susceptibility $X_{irr}$ is defined as the slope in the vicinity of a residual coercive force Hr in the slope of the residual magnetization curve (DCD curve). First, a magnetic field of −1193 kA/m (15 kOe) is applied to the entire magnetic recording medium, and the magnetic field is returned to zero to obtain a residual magnetization state. After that, a magnetic field of approximately 15.9 kA/m (200 Oe) is applied in the opposite direction, the magnetic field is returned to zero again, and the residual magnetization amount is measured. After that, similarly, measurement of applying a magnetic field 15.9 kA/m larger than the above applied magnetic field and returning the magnetic field to zero is repeatedly performed, and the residual magnetization amount is plotted against the applied magnetic field to measure the DCD curve. The point where the magnetization amount is zero in the obtained DCD curve is taken as the residual coercive force Hr, and the DCD curve is differentiated to obtain the slope of the DCD curve at each magnetic field. The slope in the vicinity of the residual coercive force Hr in the slope of this DCD curve is $X_{irr}$.

(Saturation Magnetization Ms)

First, the M-H loop of the entire magnetic recording medium (measurement sample) is measured in the direction perpendicular to the magnetic recording medium. Next, coating films (the underlayer 12, the recording layer 13, and the like) are wiped using acetone and ethanol or the like to leave only the substrate 11, and the M-H loop of the substrate 11 is measured similarly in the perpendicular direction for background correction. After that, the M-H loop after the background correction is calculated by subtracting the M-H loop of the substrate 11 from the M-H loop of the entire magnetic recording medium. From the value of the saturation magnetization Ms (emu) of the obtained M-H loop and the volume (cm$^3$) of the recording layer 13 in the measurement sample, Ms (emu/cm$^3$) is calculated. Note that the volume of the recording layer 13 is obtained by multiplying the area of the measurement sample by the average thickness $\delta_{mag}$ of the recording layer 13. The method of calculating the average thickness $\delta_{mag}$ of the recording layer 13 necessary for calculating the volume of the recording layer 13 will be described later.

(Magnetic Viscosity Coefficient S)

First, a magnetic field of −1193 kA/m (15 kOe) is applied to the entire magnetic recording medium (measurement sample), and the magnetic field is returned to zero to obtain the residual magnetization state. After that, a magnetic field equivalent to the value of the residual coercive force Hr obtained from the DCD curve is applied in the opposite direction. The magnetic amount is continuously measured at constant time intervals for 1000 seconds while the magnetic field is applied. The relationship between a time t and a magnetization amount M(t) obtained in this way is checked against the following formula to calculate the magnetic viscosity coefficient S.

$$M(t) = M0 + S \times \ln(t)$$

(in which, M(t): magnetization amount at time t, M0: initial magnetization amount, S: magnetic viscosity coefficient, ln(t): natural logarithm of time)

(SFD)

Figure 2:
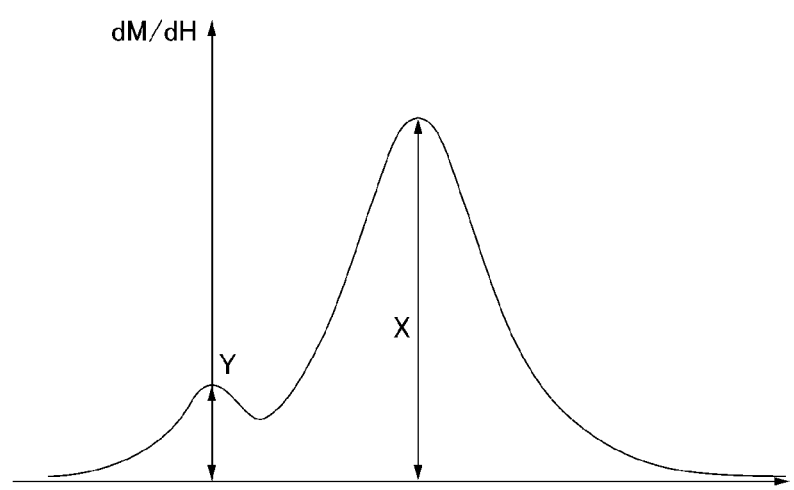
FIG. 2 is a graph showing an example of an SFD curve.

In the SFD (Switching Field Distribution) curve of the magnetic recording medium, a ratio Y/X of a sub peak height Y near the zero magnetic field to a main peak height X is favorably not more than 0.5 (see FIG. 2). In the case where the ratio Y/X exceeds 0.5, there is a possibility that magnetic properties of the recording layer 13 are deteriorated, and the C/N value is deteriorated. This is considered because in the case where the ratio Y/X exceeds 0.5, there are many soft magnetic particles and superparamagnetic particles in addition to ε-iron oxide particles that contribute to actual recording.

The above-mentioned ratio Y/X is obtained as follows. First, the M-H loop of the entire magnetic recording medium (measurement sample) is measured using a VSM. After that, coating films (the underlayer 12, the recording layer 13, and the like) are wiped using acetone and ethanol to leave only the substrate 11, and the M-H loop of the substrate 11 is measured for background correction. After that, the M-H loop after the background correction is obtained by subtracting the M-H loop of the substrate 11 from the M-H loop of the entire magnetic recording medium. Next, an SFD curve is calculated from the obtained M-H loop. For the calculation of the SFD curve, a program attached to a measurement device may be used, or another program may be used. The ratio Y/X is calculated by regarding the absolute value of the point where the calculated SFD curve crosses the Y axis (dM/dH) as "Y" and the main peak height seen in the vicinity of the coercive force Hc in the M-H loop as "X". Note that the above-mentioned measurement of the M-H loop is performed at room temperature (23° C.). Further, in the case where the M-H loop after the background correction is not saturated in the measurement of the M-H loop by the VSM, a SQUID that can obtain a higher applied magnetic field is used. The above-mentioned ratio Y/X is a value obtained by performing measurement in the direction perpendicular to the recording layer 13. Further, "demagnetizing field correction" when performing measurement in the perpendicular direction is not performed.

(Substrate)

The substrate 11 as a supporting body is an elongated nonmagnetic substrate having flexibility. The nonmagnetic substrate is a film, and the thickness of the film is, for example, not less than 3 μm and not more than 8 μm. As the material of the substrate 11, for example, polyesters such as polyethylene terephthalate, polyolefins such as polyethylene and polypropylene, cellulose derivatives such as cellulose triacetate, cellulose diacetate, and cellulose butyrate, vinyl resins such as polyvinyl chloride and polyvinylidene chloride, plastics such as polycarbonate, polyimide, and polyamideimide, light metals such as aluminum alloys and titanium alloys, ceramics such as alumina glass, and the like can be used.

(Recording Layer)

The recording layer 13 is a so-called perpendicular recording layer, and includes, for example, a magnetic powder, a binder, and conductive particles. The recording layer 13 may further contain additives such as a lubricant, an abrasive, and a rust inhibitor as necessary.

(Magnetic Powder)

The magnetic powder includes a powder of nanoparticles contain ε-iron oxide (hereinafter, referred to as "ε-iron oxide particles"). The ε-iron oxide particles each have a spherical shape, a substantially spherical shape, a cubic shape, or a substantially cubic shape. Since the ε-iron oxide particles each have the above-mentioned shape, in the case of using the ε-iron oxide particles as magnetic particles, it is possible to reduce the contact area between the particles in the thickness direction of the medium and suppress the aggregation of the particles as compared with the case of using barium ferrite particles each having a hexagonal plate-like shape as magnetic particles. That is, it is possible to increase the dispersibility of the magnetic powder, and improve the C/N value.

It is favorable that the ε-iron oxide contained in ε-iron oxide particles has ε-$Fe_2O_3$ crystal (including those in which a part of the Fe site is substituted with a metal element M) as the main phase. It is more favorable that the ε-iron oxide is formed of ε-$Fe_2O_3$ in a single phase. The metal element M represents, for example, one or more selected from the group consisting of Al, Ga, and In. However, when the molar ratio of M and Fe in the iron oxide is expressed as M:Fe-x:(2-x), 0≤x<1.

In the present technology, the ε-$Fe_2O_3$ crystal includes, unless otherwise specified, crystal in which a part of the Fe site is substituted with a trivalent metal element M and the space group is the same as that of pure ε-$Fe_2O_3$ crystal (i.e., the space group is $Pna2_1$) in addition to pure ε-$Fe_2O_3$ crystal in which the Fe site is not substituted with another element.

(Average Particle Diameter)

The average particle diameter (diameter) $D_{ave}$ of the magnetic powder is favorably not less than 8 nm and not more than 25 nm, and more favorably not less than 12 nm and not more than 20 nm. In the case where the average particle diameter $D_{ave}$ of the magnetic powder is not less than 8 nm, the dispersibility of the particles is further improved, and a more excellent C/N value can be obtained. Meanwhile, in the case where the average particle diameter $D_{ave}$ of the magnetic powder is not more than 25 nm, it is possible to obtain a recording layer that is more suitable for high recording density.

The above-mentioned average particle diameter $D_{ave}$ of the magnetic powder is obtained as follows. First, a magnetic recording medium to be measured is processed by an FIB (Focused Ion Beam) method or the like to prepare a slice for TEM (Transmission Electron Microscope) observation, and the cross section of the slice is observed by the TEM. Next, 500 ε-iron oxide particles are randomly selected from the TEM image, and the area S of each particle is obtained. Next, assuming that the cross-sectional shape of the particle is circular, the particle diameter (diameter) R of each particle is calculated as particle diameter on the basis of the following formula to obtain the particle size distribution of the magnetic powder.

$$R=2\times(S/\pi)^{1/2}$$

Next, the median diameter (50% diameter, D50) is obtained from the obtained particle size distribution, and this is taken as the average particle diameter $D_{ave}$.

(Coefficient of Variation)

It is favorable that the coefficient of variation of the magnetic powder represented by the following formula is not more than 30%.

Coefficient of variation [%]=([Standard deviation of particle diameter]/[Average particle diameter])× 100

When the coefficient of variation exceeds 30%, the variation in particle diameter of ε-iron oxide particles becomes large, and there is a possibility that variation in magnetic properties of the magnetic powder becomes large.

The coefficient of variation of the above-mentioned magnetic powder is obtained as follows. First, the particle size distribution of the magnetic powder is obtained in the same way as that of the above-mentioned method of calculating the average particle diameter. Next, the median diameter (50% diameter, D50) is obtained from the obtained particle size distribution, and this is taken as the average particle diameter $D_{ave}$. Further, a standard deviation σ is obtained from the obtained particle size distribution. Next, a coefficient of variation $σ/D_{ave}$ is calculated from the obtained average particle diameter $D_{ave}$ and standard deviation σ of the particle size distribution.

($D_{max}$, $D_{min}$, $D_{max}/D_{min}$)

An average longest diameter $D_{max}$ of ε-iron oxide particles is, for example, not less than 10 nm and not more than 30 nm. An average shortest diameter $D_{min}$ of ε-iron oxide particles is, for example, not less than 9.1 nm and not more than 27.3 nm. It is favorable that the ratio ($D_{max}/D_{min}$) of the average longest diameter $D_{max}$ of ε-iron oxide particles to the average shortest diameter $D_{min}$ satisfies the relationship of 1.0≤($D_{max}/D_{min}$)≤1.1. In the case where the ratio ($D_{max}/D_{min}$) does not satisfy the above-mentioned relationship, since stacking easily occurs in the ε-iron oxide particles, there is a possibility that the C/N value is reduced.

Figure 3:
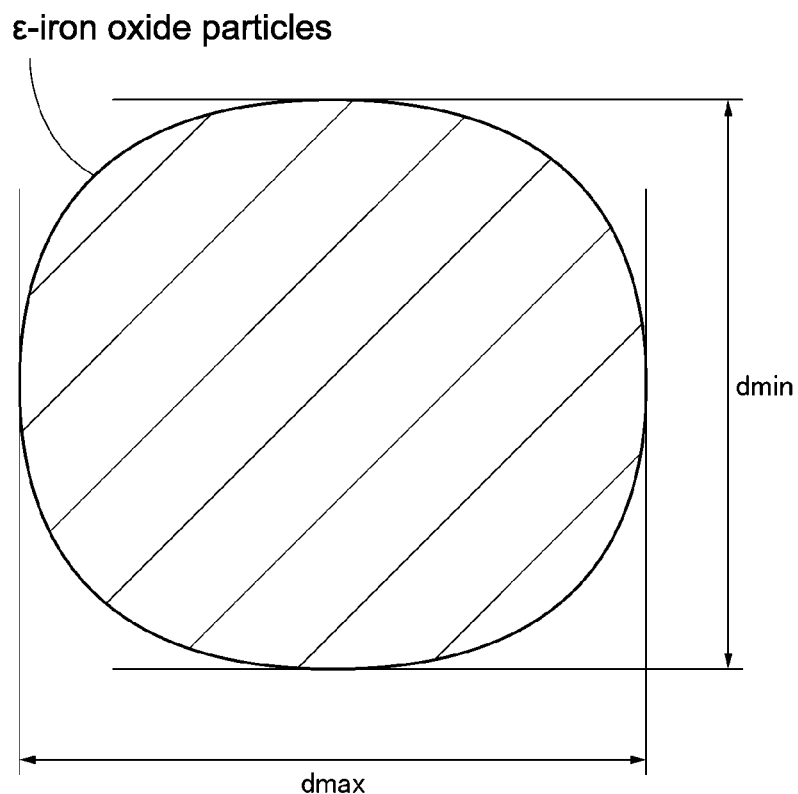
FIG. 3 is a schematic diagram for describing definitions of an average longest diameter and an average shortest diameter.

The average longest diameter $D_{max}$, the average shortest diameter $D_{min}$, and the ratio ($D_{max}/D_{min}$) are obtained as follows. First, a magnetic recording medium to be measured is processed by an FIB method or the like to prepare a slice for TEM observation, and the cross section of the slice is observed by the TEM. Next, 500 ε-iron oxide particles are randomly selected from the TEM image, and the longest diameter $d_{max}$ of the particles and the shortest diameter $d_{min}$ of the particles are measured to obtain the particle size distribution of the longest diameter $d_{max}$ of the magnetic powder and the particle size distribution of the shortest diameter $d_{min}$ of the magnetic powder. Here, the "longest diameter $d_{max}$ of the particles" means the so-called maximum Feret diameter, and specifically represents the largest distance between two parallel lines drawn from any angle so as to be in contact with the outline of the ε-iron oxide particle as shown in FIG. 3. Meanwhile, the "shortest diameter $d_{min}$ of the particles" means the so-called minimum Feret diameter, and represents the shortest distance between two parallel lines drawn from any angle so as to be in contact with the outline of the ε-iron oxide particle as shown in FIG. 3. After that, the median diameter (50% diameter, D50) of the longest diameter $d_{max}$ is obtained from the obtained particle size distribution of the longest diameter $d_{max}$, and this is taken as the average longest diameter $D_{max}$ of the particles. Similarly, the median diameter (50% diameter, D50) of the shortest diameter $d_{min}$ is obtained from the obtained particle size distribution of shortest diameter $d_{min}$, and this is taken as the average shortest diameter $D_{min}$ of the particles. Finally, the ratio ($D_{max}/D_{min}$) is obtained by using the average longest diameter $D_{max}$ and the average shortest diameter $D_{min}$ obtained as described above.

(Average Thickness of Recording Layer)

The average thickness $δ_{mag}$ of the recording layer 13 is favorably not more than 100 nm, more favorably not more than 90 nm, and still more favorably not more than 80 nm, most favorably not more than 70 nm. In the case where the average thickness $δ_{mag}$ exceeds 100 nm, there is a possibility that it becomes difficult for the perpendicular magnetic field from the ring-type head to reach the lower part of the recording layer 13, which reduces the C/N value.

The lower limit of the average thickness $δ_{mag}$ of the recording layer 13 is not particularly limited. However, in the case where the average thickness $δ_{mag}$ of the recording layer 13 is too small, there is a possibility that it becomes difficult to form the recording layer 13 having a uniform thickness by coating. Considering this point, the average thickness $δ_{mag}$ of the recording layer 13 is favorably not less than 30 nm, more favorably not less than 40 nm, and still more favorably not less than 50 nm.

The average thickness $δ_{mag}$ [nm] of the recording layer 13 is obtained as follows. First, a magnetic recording medium to be measured is processed by an FIB method or the like to prepare a slice for TEM observation, and the cross section of the slice is observed by the TEM. It is favorable that the observation magnification be at least not less than 100,000 times so that the thickness of the recording layer 13 can be clearly observed. The observation of the cross-sectional TEM is performed at total five positions for every 100 m in the longitudinal direction (traveling direction) of the magnetic recording medium. The observation direction is the lateral direction (width direction) of the magnetic recording medium. The thickness of the recording layer 13 is observed at evenly 50 points per field of view, and the average thickness $δ_{mag}$ [nm] of the recording layer 13 is obtained by simply averaging (arithmetic average) the thicknesses in all five fields of view.

($δ_{mag}/D_{min}$)

It is favorable that the ratio ($δ_{mag}/D_{min}$) of the average thickness $δ_{mag}$ of the recording layer 13 to the average shortest diameter $D_{min}$ of the ε-iron oxide particles satisfies the relationship of $δ_{mag}/D_{min}$≤5. It is more favorable that the ratio ($δ_{mag}/D_{min}$) satisfies the relationship of $δ_{mag}/D_{min}$≤4.5. In the case where the ratio ($δ_{mag}/D_{min}$) does not satisfy the above-mentioned relationship, there is a possibility that it becomes difficult for the perpendicular magnetic field from the ring-type head to reach the ε-iron oxide particles present in the lower part of the recording layer 13, which reduces the C/N value.

The ratio ($δ_{mag}/D_{min}$) is obtained as follows. First, in the same way as the above-mentioned method of calculating the average thickness $δ_{mag}$ of the recording layer 13 and the average shortest diameter $D_{min}$ of the ε-iron oxide particles, the values thereof are obtained. Next, the ratio ($δ_{mag}/D_{min}$) is calculated by using the obtained average thickness $δ_{mag}$ and average shortest diameter $D_{min}$ of the ε-iron oxide particles.

(Binder)

As the binder, resin having a structure obtained by causing a crosslinking reaction to occur in polyurethane resin, vinyl chloride resin, or the like is favorable. However, the binder is not limited thereto, and other resins may be appropriately blended in accordance with, for example, the physical properties required for the magnetic recording medium. The resin to be blended is not particularly limited as long as it is resin generally used in a coating-type magnetic recording medium.

Examples of the resin include polyvinyl chloride, polyvinyl acetate, vinyl chloride-vinyl acetate copolymer, vinyl chloride-vinylidene chloride copolymer, vinyl chloride-acrylonitrile copolymer, acrylate ester-acrylonitrile copolymer, acrylate ester-vinyl chloride-vinylidene chloride copolymer, vinyl chloride-acrylonitrile copolymer, acrylate ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose), styrene butadiene copolymer, polyester resin, amino resin, and synthetic rubber.

Further, examples of thermosetting resin or reactive resin include phenol resin, epoxy resin, urea resin, melamine resin, alkyd resin, silicone resin, polyamine resin, and urea formaldehyde resin.

Further, in order to improve the dispersibility of the magnetic powder, polar functional groups such as —$SO_3M$, —$OSO_3M$, —COOM, and P=O(OM)$_2$ may be introduced into the above-mentioned binders. Here, M in the formula represents a hydrogen atom or an alkali metal such as lithium, potassium, and sodium.

Further, examples of the polar functional groups include a side-chain group having a terminal group of —NR1R2 or —NR1R2R3$^+$X$^-$, and a main-chain group of >NR1R2$^+$X$^-$. Here, R1, R2, and R3 in the formula each represent a hydrogen atom or a hydrocarbon group, and X$^-$ represents a halogen element ion such as fluorine, chlorine, bromine, and iodine, or an inorganic or organic ion. Further, examples of the polar functional groups include also —OH, —SH, —CN, and an epoxy group.

(Additives)

The recording layer 13 may further contain, as nonmagnetic reinforcing particles, aluminum oxide (α, β, or γ alumina), chromium oxide, silicon oxide, diamond, garnet, emery, boron nitride, titanium carbide, silicon carbide, titanium carbide, and titanium oxide (rutile-type or anatase-type titanium oxide).

(Underlayer)

The underlayer 12 is a nonmagnetic layer containing a nonmagnetic powder and a binder as main components. The underlayer 12 may further contain additives of at least one of conductive particles, a lubricant, a curing agent, and a rust inhibitor as necessary.

(Average Thickness of Underlayer)

The average thickness of the underlayer 12 is favorably not less than 0.6 μm and not more than 2.0 μm, and more favorably not less than 0.8 μm and not more than 1.4 μm. In the case where the average thickness of the underlayer 12 is less than 0.6 μm, there is a possibility that the electromagnetic conversion characteristics are deteriorated due to deterioration of the surface property. Meanwhile, in the case where the average thickness of the underlayer 12 exceeds 2.0 μm, coarse protrusions are generated due to drying unevenness of the coating film, and there is a possibility that the electromagnetic conversion characteristics are deteriorated similarly. Note that the method of calculating the above-mentioned average thickness of the underlayer 12 is similar to the method of calculating the average thickness $\delta_{mag}$ of the recording layer 13.

(Nonmagnetic Powder)

The nonmagnetic powder may be an inorganic material or an organic material. Further, the nonmagnetic powder may be carbon black or the like. Examples of the inorganic material include a metal, a metal oxide, a metal carbonate, a metal sulfate, a metal nitride, a metal carbide, and a metal sulfide. Examples of the shape of the nonmagnetic powder include, but not limited to, various shapes such as a needle shape, a spherical shape, a cubic shape, and a plate shape.

(Binder)

The binder is similar to that in the above-mentioned recording layer 13.

[Method of Producing Magnetic Powder]

Figure 4:
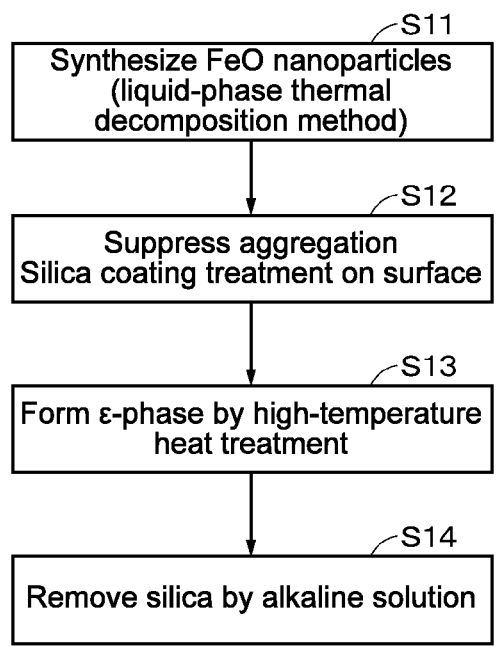
FIG. 4 is a process chart for describing a method of producing a magnetic powder.

Hereinafter, a method of producing the above-mentioned magnetic powder will be described with reference to FIG. 4 and Parts A to D of FIG. 5. In the method of producing the magnetic powder, a powder of ε-iron oxide particles is synthesized by using a powder of nanoparticles containing FeO (ferrous oxide) (hereinafter referred to as "FeO particles") as a starting raw material.

(Synthesis of FeO Particles)

Figure 5:
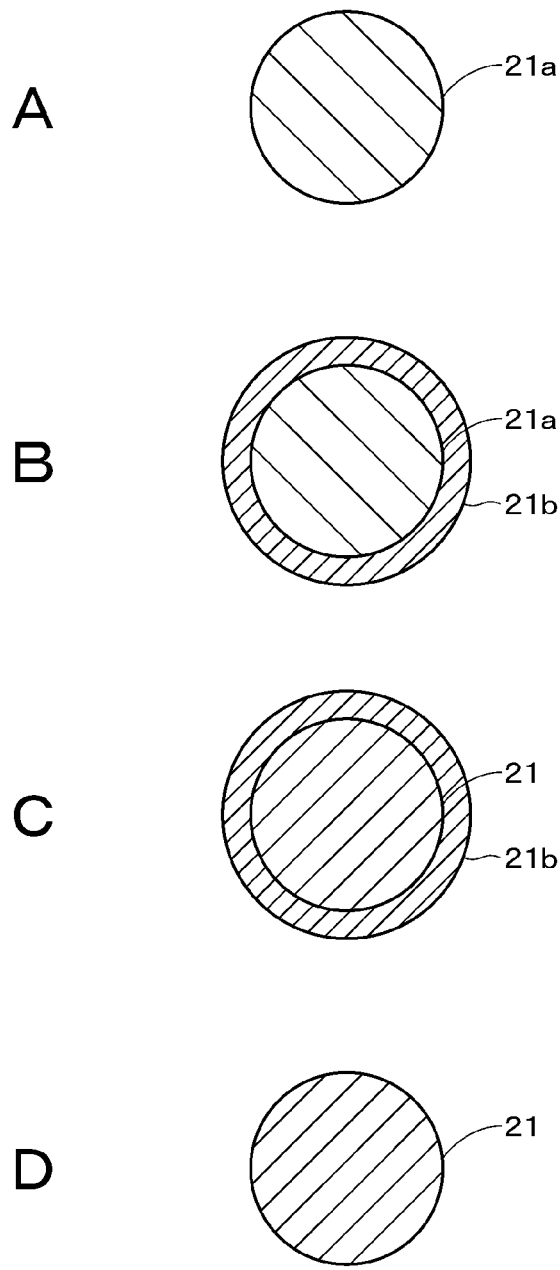
FIG. 5 Parts A to D of FIG. 5 are each a cross-sectional view for describing the method of producing the magnetic powder.

First, in Step S11, as shown in Part A of FIG. 5, a powder of FeO particles (first particles) 21a as a starting raw material is synthesized in a vacuum by a liquid-phase complex thermal decomposition method. At this time, it is favorable to use oleic acid and oleylamine as a solvent and a ligand. This is because FeO particles with less aggregation can be synthesized. Accordingly, a powder of the FeO particles 21a having sharp particle size distribution can be obtained. Note that by adjusting the heat treatment time in the liquid-phase complex thermal decomposition method, the particle diameter of FeO particles as precursor particles can be changed. Specifically, the particle diameter can be reduced as the heat treatment time is lengthened.

In the above-mentioned step, it is favorable to synthesize the powder of the FeO particles 21a so that the particle size distribution, the average longest diameter $D_{max}$, the average shortest diameter $D_{min}$, and the ratio ($D_{max}/D_{min}$) of the powder of the FeO particles 21a is substantially the same as those of the target magnetic powder. This is because the particle size distribution, the average longest diameter $D_{max}$, the average shortest diameter $D_{min}$, and the ratio ($D_{max}/D_{min}$) of the powder of the FeO particles 21a are substantially the same as those of a magnetic powder to be finally obtained.

(Coating Treatment)

Next, in Step S12, silica coating treatment is performed on the surfaces of the FeO particles 21a by a reverse micelle method in order to suppress particle aggregation due to high-temperature heat treatment in the next step. Accordingly, as shown in Part B of FIG. 5, a silica coated layer 21b is formed on the surfaces of the FeO particles 21a.

(High-Temperature Heat Treatment)

Next, in Step S13, the powder of the FeO particles 21a is transformed into a powder of ε-iron oxide particles (second particles) 21 as shown in Part C of FIG. 5 by firing the powder of the FeO particles 21a on which the silica coating treatment has been performed at a high temperature not less than 1000° C.

(Coating Removal)

Finally, in Step S14, as shown in Part D of FIG. 5, a target powder of the ε-iron oxide particles 21 is obtained by removing the silica coated layer 21b on the surfaces of the ε-iron oxide particles 21 by using an alkaline solution.

[Method of Producing Magnetic Recording Medium]

Next, an example of the method of producing the magnetic recording medium having the above-mentioned configuration will be described. First, a nonmagnetic powder, a binder, and the like are kneaded and dispersed in a solvent to prepare a coating material for forming an underlayer. Next, a magnetic powder, a binder, and the like are kneaded and dispersed in a solvent to prepare a coating material for forming a recording layer. For the preparation of the coating material for forming a recording layer and the coating material for forming an underlayer, for example, the following solvents, dispersing devices, and kneading devices can be used.

Examples of the solvent used for preparing the above-mentioned coating material include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These may be used alone or mixed appropriately for use.

As the kneading device used for preparing the above-mentioned coating material, for example, kneading device such as a continuous twin-screw kneader, a continuous twin-screw kneader capable of performing dilution in multi-stages, a kneader, a pressure kneader, and a roll kneader can be used. However, the present technology is not particularly limited to these devices. Further, as the dispersing device used for preparing the above-mentioned coating material, for example, dispersing devices such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.) a homogenizer, and an ultrasonic dispersion machine can be used. However, the present technology is not particularly limited these devices.

Next, the coating material for forming an underlayer is coated on one main surface of the substrate 11 and dried to form the underlayer 12. Next, the coating material for forming a recording layer is coated on the underlayer 12 and dried to form the recording layer 13 on the underlayer 12. Note that during drying, the magnetic field of the magnetic powder may be oriented in the thickness direction of the substrate 11 by, for example, a solenoid coil. After forming the recording layer 13, as necessary, a protective layer and a lubricant layer may be formed on the recording layer 13, or the backcoat layer 14 may be formed on the other main surface of the substrate 11.

After that, the substrate 11 on which the underlayer 12 and the recording layer 13 are formed is rewound around the large-diameter core and hardened. Next, calendaring treatment is performed on the substrate 11 on which the underlayer 12 and the recording layer 13 are formed, and then it is cut into a predetermined a width. Thus, a target magnetic recording medium can be obtained.

[Effect]

The magnetic recording medium according to the first embodiment of the present technology is a magnetic recording medium used in a recording/reproduction apparatus having the shortest recording wavelength of not more than 75 nm, the magnetic recording medium including the recording layer 13 that contains a powder of particles containing ε-iron oxide. A squareness ratio measured in a traveling direction of the magnetic recording medium is not more than 30%, the ratio ($D_{max}/D_{min}$) of the average longest diameter $D_{max}$ of the particles to the average shortest diameter $D_{min}$ of the particles satisfies the relationship of $1.0 \leq (D_{max}/D_{min}) \leq 1.1$, the average thickness $\delta_{mag}$ of the recording layer is not more than 100 nm, and the ratio ($\delta_{mag}/D_{min}$) of the average thickness $\delta_{mag}$ of the recording layer to the average shortest diameter $D_{min}$ of the particles satisfies a relationship of $\delta_{mag}/D_{min} \leq 5$. Accordingly, it is possible to improve the C/N value of the magnetic recording medium.

Modified Example

Modified Example 1

Figure 6:
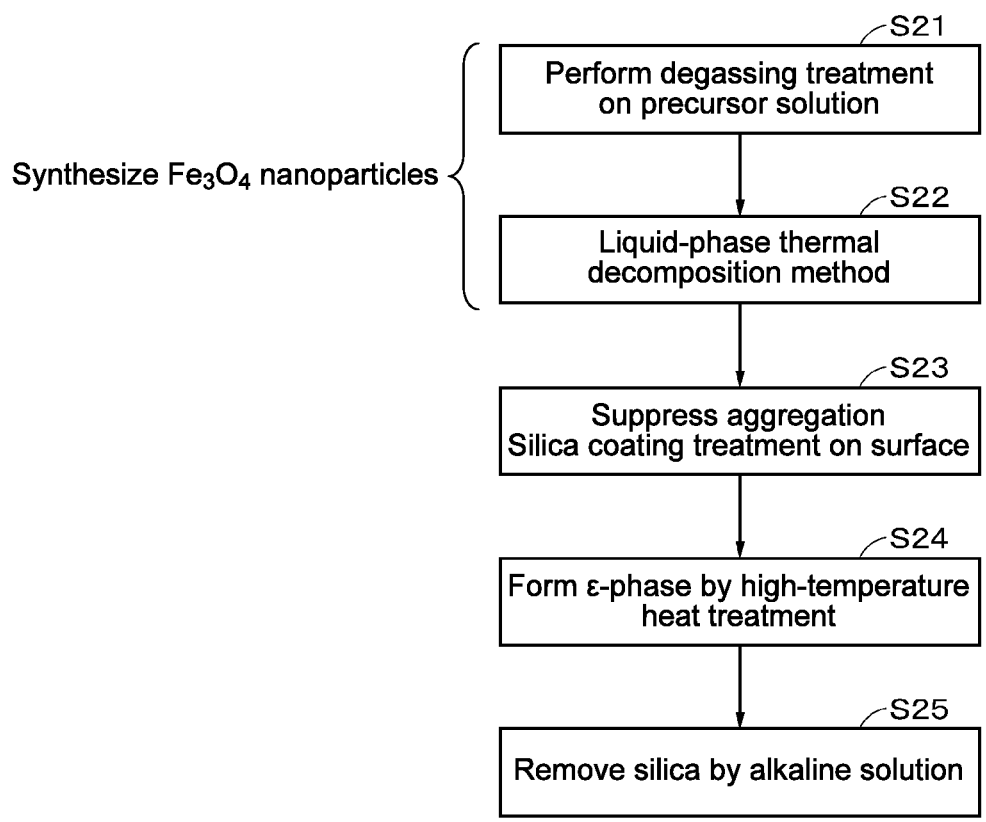
FIG. 6 is a process chart for describing a method of producing a magnetic powder.

A powder of ε-iron oxide particles may be synthesized by using a powder of nanoparticles (hereinafter, referred to as "$Fe_3O_4$ particles") containing $Fe_3O_4$ (triiron tetraoxide) as a starting raw material. Hereinafter, an example of the method of producing a magnetic powder using the powder of $Fe_3O_4$ particles as a starting raw material will be described with reference to FIG. 6 and Parts A to D of FIG. 7.

(Degassing Treatment)

First, in Step S21, iron acetylacetonate is mixed with a solvent to prepare a precursor solution, and then degassing treatment is performed on the precursor solution. As the solvent, those functioning also as ligands are used, and oleic acid and oleylamine are favorable. This is because $Fe_3O_4$ particles with less aggregation can be synthesized, so that a powder of $Fe_3O_4$ particles having sharp particle size distribution can be obtained. As the concentration of iron acetylacetonate in the precursor solution, the diameter of $Fe_3O_4$ particles as precursor particles can be increased.

Although the method of the degassing treatment is not particularly limited, a method of performing heat treatment on the prepared solution under a reduced pressure atmosphere is favorable. By adopting this method, it is possible to suppress the generation of bubbles also in the case of synthesizing a large amount of $Fe_3O_4$ particles. Further, since those having a low boiling point among the impurities contained in the precursor solution or moisture generated when mixing oleic acid and oleylamine can be removed, it is easy to obtain $Fe_3O_4$ particles having uniform particle size distribution even in a mass synthesis system.

Note that also by dissolving iron acetylacetonate as the raw material in a highly soluble solvent (e.g., phenylethyl ether) in advance, it is possible to suppress the generation of bubbles in the next step. In the case of dissolving iron acetylacetonate in a highly soluble solvent in advance, the degassing treatment may or may not be performed.

(Liquid-Phase Thermal Decomposition Method)

Figure 7:
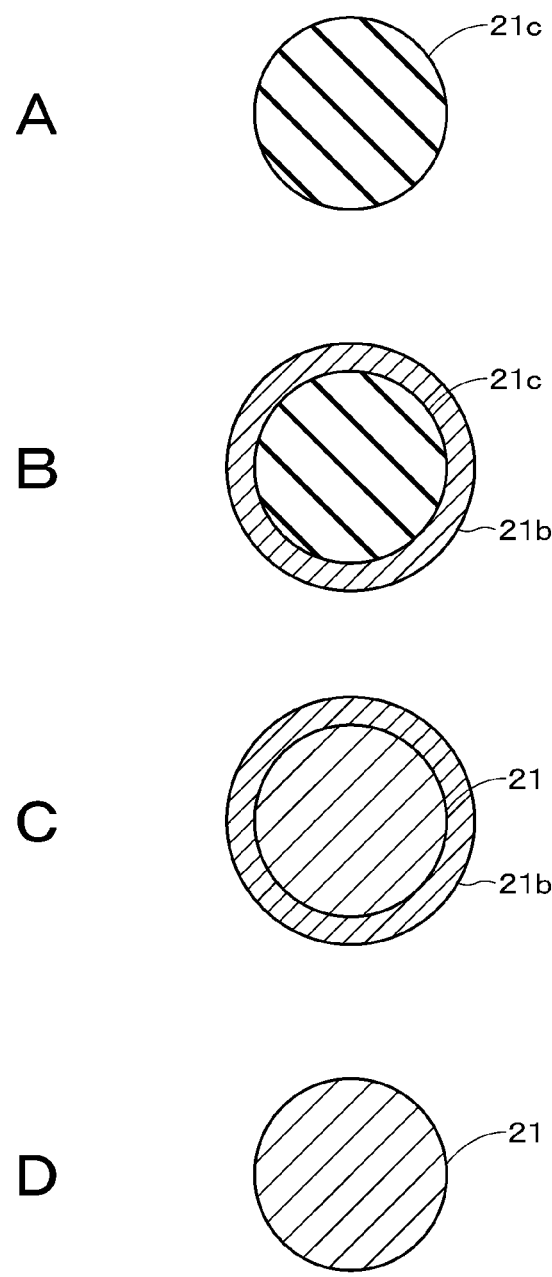
FIG. 7 Parts A to D of FIG. 7 are each a cross-sectional view for describing the method of producing the magnetic powder.

Next, in Step S22, as shown in Part A of FIG. 7, by a liquid-phase complex thermal decomposition method, a powder of $Fe_3O_4$ particles (first particles) 21c as the starting raw material (precursor particles) is synthesized using the solution on which the degassing treatment has been performed. Specifically, the degassed solution is heated under an inert gas atmosphere such as nitrogen gas. Accordingly, nuclei are formed in the precursor solution, and then the formed nuclei grow to synthesize the $Fe_3O_4$ particles 21c.

In the above-mentioned step, it is favorable to synthesize the powder of the $Fe_3O_4$ particles 21c so that the particle size distribution, the average longest diameter $D_{max}$, the average shortest diameter $D_{min}$, and the ratio ($D_{max}/D_{min}$) of the powder of the $Fe_3O_4$ particles 21c are substantially the same as those of a target magnetic powder. This is because the particle size distribution, the average longest diameter $D_{max}$, the average shortest diameter $D_{min}$, and the ratio ($D_{max}/D_{min}$) of the powder of the $Fe_3O_4$ particles 21c are substantially the same as those of a magnetic powder to be finally obtained.

(Coating Treatment)

Next, in Step S23, silica coating treatment is performed on the surfaces of the $Fe_3O_4$ particles 21c by a reverse micelle method in order to suppress particle aggregation due to high-temperature heat treatment in the next step. Accordingly, as shown in Part B of FIG. 7, the silica coated layer 21b is formed on the surfaces of the $Fe_3O_4$ particles 21c.

(High-Temperature Heat Treatment)

Next, in Step S24, the powder of the $Fe_3O_4$ particles 21c is transformed into a powder of ε-iron oxide particles (second particles) 11 as shown in Part C of FIG. 7 by firing the powder of the $Fe_3O_4$ particles 21c on which the silica coating treatment has been performed at a high temperature not less than 1000° C.

(Coating Removal)

Finally, in Step S25, as shown in Part D of FIG. 7, a target powder of the ε-iron oxide particles 21 is obtained by removing the silica coated layer 21b on the surfaces of the ε-iron oxide particles 21 by using an alkaline solution.

Modified Example 2

Figure 8:
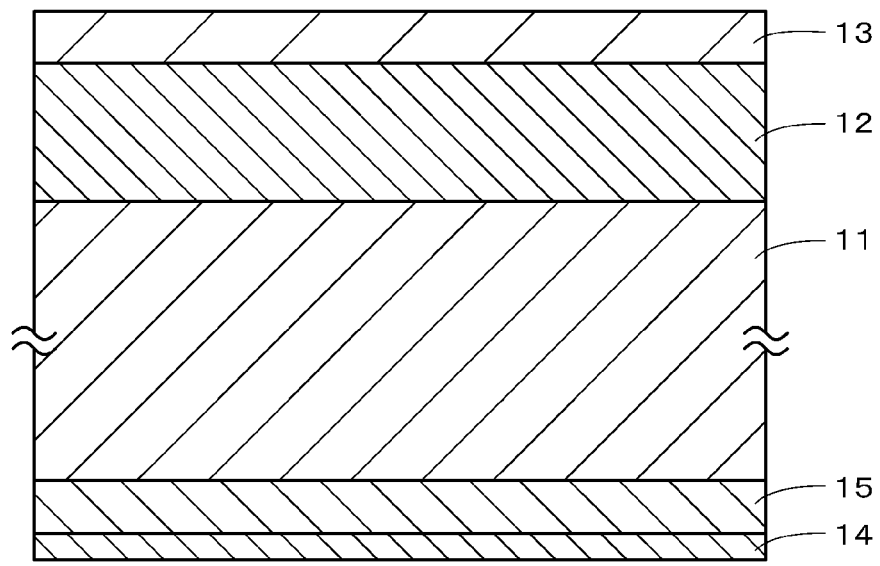
FIG. 8 is a cross-sectional view showing a configuration of a magnetic recording medium.

As shown in FIG. 8, the magnetic recording medium may further include a reinforcement layer 15 provided on the other main surface (hereinafter, referred to as "rear surface") that is the side of the backcoat layer 14 of both main surfaces of the substrate 11. In this case, the backcoat layer 14 is provided on the reinforcement layer 15.

Note that the reinforcement layer 15 may be provided on either of the both main surfaces of the substrate 11, and the reinforcement layer 15 may be provided on one surface (hereinafter, referred to as "front surface") that is the side of the recording layer 13 of the both main surfaces of the substrate 11. In this case, the underlayer 12 is provided on the reinforcement layer 15.

The reinforcement layer 15 is for enhancing the mechanical strength of the magnetic recording medium and achieving excellent dimensional stability. The reinforcement layer 15 contains, for example, at least one of a metal and a metal compound. Here, it is defined that the metal includes semimetal. The metal is, for example, at least one of aluminum and copper, and is favorably copper. This is because copper is inexpensive and has relatively low vapor pressure, so that the reinforcement layer 15 can be deposited at low cost. The metal compound is, for example, metal oxide. The metal oxide is for example, at least one of aluminum oxide, copper oxide, and silicon oxide, and is favorably copper oxide. This is because the reinforcement layer 15 can be deposited at low cost by a vapor deposition or the like. The reinforcement layer 15 may be, for example, a deposition film formed by a vacuum oblique evaporation method or a sputtering film formed by a sputtering method.

The reinforcement layer 15 favorably has a laminated structure of two or more layers. As the thickness of the reinforcement layer 15 is increased, expansion and contraction of the substrate 11 against external force can be further suppressed. However, in the case of forming the reinforcement layer 15 by using a technology for producing a vacuum thin film such as a deposition method and sputtering, there is a possibility that voids tend to occur in the reinforcement layer 15 as the thickness of the reinforcement layer 15 is increased as described above. By forming the reinforcement layer 15 to have a laminated structure of two or more layers as described above, it is possible to suppress the voids generated in the reinforcement layer 15 when forming the reinforcement layer 15 by using the technology for producing a vacuum thin film, and improve the denseness of the reinforcement layer 15. Therefore, since the water vapor permeability of the reinforcement layer 15 can be reduced, it is possible to further suppress the expansion of the substrate 11 and further improve the dimension stability of the magnetic recording medium. In the case where the reinforcement layer 15 has a laminated structure of two or more layers, the materials of each layer may be the same or different.

The average thickness of the reinforcement layer 15 is favorably not less than 150 nm and not more than 500 nm. In the case where the average thickness of the reinforcement layer 15 is not less than 150 nm, a favorable function (i.e., favorable dimension stability of the magnetic recording medium) as the reinforcement layer 15 is achieved. Meanwhile, a sufficient function as the reinforcement layer 15 can be achieved without increasing the average thickness of the reinforcement layer 15 to more than 500 nm. Note that the above-mentioned average thickness of the reinforcement layer 15 is obtained in the same way as that of the method of calculating the above-mentioned average thickness $\delta_{mag}$ of the recording layer 13.

In the case where the magnetic recording medium includes the reinforcement layer 15, the Young's modulus in the longitudinal direction of the elongated magnetic recording medium is favorably not less than 7 GPa and not more than 14 GPa. In the case where the Young's modulus is not less than 7 GPa, it is possible to achieve favorable magnetic head contact and suppress edge damage. Meanwhile, in the case where the Young's modulus is not more than 14 GPa, it is possible to achieve favorable magnetic head contact.

Further, the humidity expansion coefficient of the magnetic recording medium is favorably not less than 0.5 ppm/% RH and not more than 4 ppm/% RH. In the case where the humidity expansion coefficient is within the above-mentioned range, it is possible to further improve the dimension stability of the magnetic recording medium.

Modified Example 3

Figure 9:
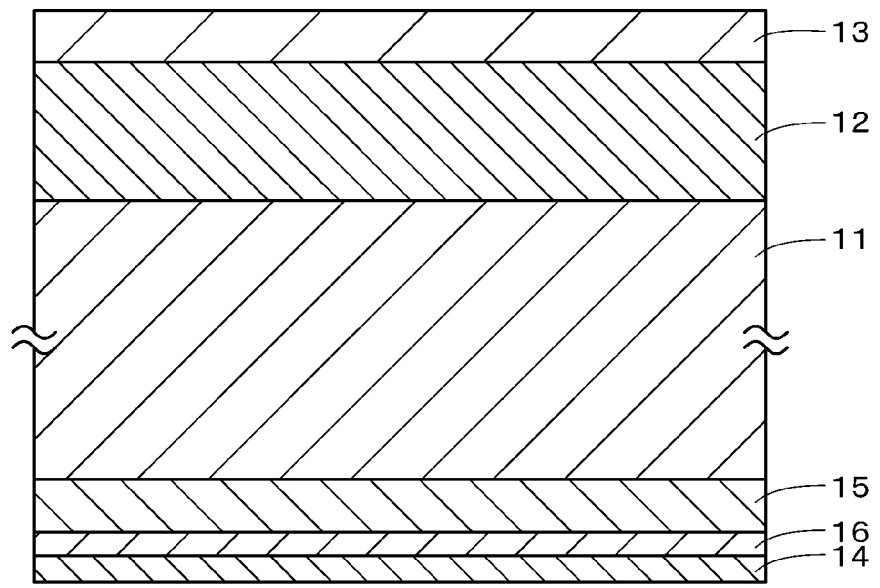
FIG. 9 is a cross-sectional view showing a configuration of a magnetic recording medium.

As shown in FIG. 9, the magnetic recording medium may further include a cupping suppression layer 16 provided on the reinforcement layer 15. Note that in the case where the underlayer 12 and the cupping suppression layer 16 are provided on the rear surface side of the substrate 11, the backcoat layer 14 is provided on the cupping suppression layer 16. Meanwhile, in the case where the underlayer 12 and the cupping suppression layer 16 are provided on the front surface side of the substrate 11, the underlayer 12 is provided on the cupping suppression layer 16.

The cupping suppression layer 16 is for suppressing cupping generated by forming the reinforcement layer 15 on the substrate 11. Here, the cupping means a curve generated in the width direction of the elongated substrate 11. Tensile stress as internal stress, i.e., stress acting to bend, in the width direction and into a concave shape, the side of the main surface on which the reinforcement layer 15 is provided of the both surfaces of the substrate 11 acts on the reinforcement layer 15. Meanwhile, compressive stress as internal stress, i.e., stress acting to bend, in the width direction and into a convex shape, the side of the main surface on which the cupping suppression layer 16 is provided of the both surfaces of the substrate 11 acts on the cupping suppression layer 16. For this reason, the internal stresses of the reinforcement layer 15 and the cupping suppression layer 16 cancel out each other, making it possible to suppress occurrence of cupping in the magnetic recording medium. Therefore, it is possible to maintain the favorable contact state between the magnetic head and the magnetic recording medium, and provide a high SN magnetic recording medium having high dimension stability in the track width direction and excellent off-track characteristics.

The cupping suppression layer 16 is, for example, a carbon thin film. The carbon thin film is favorably a hard carbon thin film containing diamond-like carbon (hereinafter, referred to as "DLC"). The cupping suppression layer 16 may be, for example, a CVD film formed by a chemical vapor deposition (CVD) method or a sputtering film formed by a sputtering method.

The cupping suppression layer 16 favorably has a laminated structure of two or more layers. This is because the dimension stability of the magnetic recording medium can be further improved. Note that the principle thereof is similar to that in the case where the reinforcement layer 15 has a laminated structure of two or more layers. In the case where the cupping suppression layer 16 has a laminated structure of two or more layers, the material of each layer may be the same or different.

The average thickness of the cupping suppression layer 16 is favorably not less than 10 nm and not more than 200 nm. In the case where the average thickness of the cupping suppression layer 16 is less than 10 nm, there is a possibility that the compressive stress of the cupping suppression layer 16 is too small. Meanwhile, in the case where the average thickness of the cupping suppression layer 16 exceeds 200 nm, there is a possibility that the compressive stress of the cupping suppression layer 16 is too large. Note that the average thickness of the cupping suppression layer 16 is obtained in the same way as that of the above-mentioned method of calculating the average thickness $\delta_{mag}$ of the recording layer 13.

Modified Example 4

Figure 10:
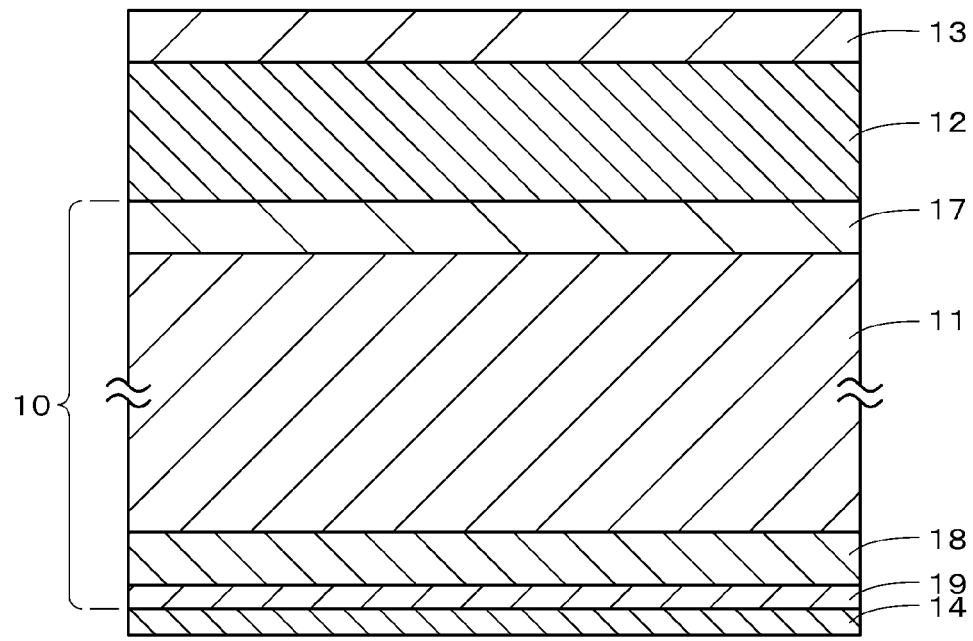
FIG. 10 is a cross-sectional view showing a configuration of a magnetic recording medium.

As shown in FIG. 10, the magnetic recording medium may further include a first reinforcement layer 17 provided on the surface of the substrate 11, a second reinforcement layer 18 provided on the rear surface of the substrate 11, and an adhesion suppression layer 19 provided on the second reinforcement layer 18. In this case, the backcoat layer 14 is provided on the adhesion suppression layer 19. The substrate 11, the first reinforcement layer 17, the second reinforcement layer 18, and the adhesion suppression layer 19 constitute a laminate 10.

Note that the adhesion suppression layer 19 only needs to be provided on any one of the first and second reinforcement layers 17 and 18, and the adhesion suppression layer 19 may be provided on the first reinforcement layer 17. In this case, the underlayer 12 is provided on the adhesion suppression layer 19. In this case, in the case where the adhesion suppression layer 19 is a carbon thin film, it is favorable to improve the wettability of the surface of the adhesion suppression layer 19 by surface modification treatment. This is because the coatability on the carbon thin film of the coating material for forming an underlayer can be improved.

The first and second reinforcement layers 17 and 18 are for enhancing the mechanical strength of the magnetic recording medium and achieving excellent dimension stability. As the materials of the first and second reinforcement layers 17 and 18, materials similar to those of the reinforcement layer 15 according to Modified Example 3 can be exemplified. Note that the materials of the first and second reinforcement layers 17 and 18 may be the same material or different materials. It is favorable that the first and second reinforcement layers 17 and 18 each have a laminated structure of two or more layers. This is because the dimension stability of the magnetic recording medium can be further improved. Note that the principle thereof is similar to that in the case where the reinforcement layer 15 has a laminated structure of two or more layers in Modified Example 3.

The average thickness of each of the first and second reinforcement layers 17 and 18 is favorably not less than 75 nm and not more than 300 nm. In the case where the average thickness of each of the first and second reinforcement layers 17 and 18 is not less than 75 nm, favorable functions (i.e., favorable dimension stability of the magnetic recording medium) as the first and second reinforcement layers 17 and 18 are achieved. Meanwhile, the average thickness of each of the first and second reinforcement layers 17 and 18 is increased to be larger than 300 nm, there is a possibility of the thickness of the magnetic recording medium is large. Further, sufficient functions as the first and second reinforcement layers 17 and 18 can be achieved without increasing the average thickness of each of the first and second reinforcement layers 17 and 18 to more than 300 nm. Note that the average thickness of each of the first and second reinforcement layers 17 and 18 is obtained in the same way as that of the above-mentioned method of calculating the average thickness $\delta_{mag}$ of the recording layer 13.

Tensile stress as internal stress acts on the first and second reinforcement layers 17 and 18. Specifically, the first reinforcement layer 17 has stress acting to bend the front surface side of the substrate 11 in the width direction and into a concave shape, and the second reinforcement layer 18 has stress acting to bend the rear surface side of the substrate 11 in the width direction and into a concave shape. Therefore, internal stresses of the first and second reinforcement layers 17 and 18 cancel out each other, making it possible to suppress occurrence of cupping in the magnetic recording medium. Here, the cupping means a curve generated in the width direction of the elongated substrate 11.

The average thicknesses of the first and second reinforcement layers 17 and 18 may be the same or different, but favorably the same or substantially the same. This is because the internal stresses (tensile stresses) the first and second reinforcement layers 17 and 18 provided on both surfaces of the substrate 11 are the same or substantially the same, so that occurrence of cupping can be further suppressed. Here, "the average thicknesses of the first and second reinforcement layers 17 and 18 are substantially the same" means that the difference between the average thicknesses of the first and second reinforcement layers 17 and 18 is within 5 nm.

The adhesion suppression layer 19 is for suppressing adhesion of the first and second reinforcement layers 17 and 18 by metal adhesion when the laminate 10 is wound into a roll. The adhesion suppression layer 19 may have conductivity or may have insulating properties. The adhesion suppression layer 19 may have compressive stress (i.e., stress acting to bend, in the width direction and into a convex shape, the side of the surface on which the adhesion suppression layer 19 is provided of both surfaces of the substrate 11) as internal stress, or tensile stress (i.e., stress acting to bend, in the width direction and into a concave shape, the side of the surface on which the adhesion suppression layer 19 is provided of the substrate 11) as internal stress.

In the case where the tensile stresses (internal stresses) of the first and second reinforcement layers 17 and 18 differ, the adhesion suppression layer 19 having compressive stress as internal stress may be provided on one of the first and second reinforcement layers 17 and 18, which has higher tensile stress. This is because the tensile stress that cannot be completely cancelled out due to the difference in the tensile stresses of the first and second reinforcement layers 17 and 18 can be canceled out by the compressive stress of the adhesion suppression layer 19. Further, the adhesion suppression layer 19 having tensile stress as internal stress may be provided on one of the first and second reinforcement layers 17 and 18, which has lower tensile stress. This is because the compressive stress generated by the difference in the tensile stresses of the first and second reinforcement layers 17 and 18 can be canceled out by the tensile stress of the adhesion suppression layer 19.

The average thickness of the adhesion suppression layer 19 is favorably not less than 1 nm and not more than 100 nm, more favorably not less than 2 nm and not more than 25 nm, and still more favorably not less than 2 nm and not more than 20 nm. In the case where the average thickness of the adhesion suppression layer 19 is not less than 1 nm, it is possible to suppress the reduction in function as the adhesion suppression layer 19 due to the average thickness of the adhesion suppression layer 19 being too small. Meanwhile, in the case where the average thickness of the adhesion suppression layer 19 is not more than 100 nm, it is possible to suppress the average thickness of the adhesion suppression layer 19 being too large, i.e., the internal stress of the adhesion suppression layer 19 being too high. The average thickness of the adhesion suppression layer 19 is obtained in the same way as that of the above-mentioned method of calculating the average thickness $\delta_{mag}$ of the recording layer 13.

In the case where an average thickness of D2 of the second reinforcement layer 18 is not less than 75 nm and not more than 300 nm, a ratio (D4/D2) of an average thickness D4 of the adhesion suppression layer 19 to the average thickness of D2 of the second reinforcement layer 18 is favorably not less than 0.005 and not more than 0.35. In the case where the ratio (D4/D2) is not less than 0.005, it is possible to suppress the reduction in function as the adhesion suppression layer 19 due to the average thickness D4 of the adhesion suppression layer 19 being too small with respect to the average thickness of D2 of the second reinforcement layer 18. Meanwhile, in the case where the ratio (D4/D2) is not more than 0.35, it is possible to suppress the average thickness D4 of the adhesion suppression layer 19 being too large with respect to the average thickness of D2 of the second reinforcement layer 18, i.e., the compressive stress of the adhesion suppression layer 19 being too high with respect to the tensile stress of the second reinforcement layer 18. Therefore, it is possible to further suppress occurrence of cupping.

The adhesion suppression layer 19 contains, for example, at least one of carbon and a metal oxide. The adhesion suppression layer 19 is favorably a carbon thin film containing carbon as a main component or a metal oxide film containing a metal oxide as a main component. The carbon is favorably diamond-like carbon (hereinafter, referred to as "DLC"). The metal oxide favorably contains at least one of aluminum oxide, copper oxide, and cobalt oxide. The adhesion suppression layer 19 may be, for example, a CVD film formed by a chemical vapor deposition (CVD) method or a sputtering film formed by a sputtering method.

The adhesion suppression layer 19 favorably has a laminated structure of two or more layers. This is because the dimension stability of the magnetic recording medium can be further improved. Note that the principle thereof is similar to that in the case where the reinforcement layer 15 has a laminated structure of two or more layers in Modified Example 3. In the case where the adhesion suppression layer 19 has a laminated structure of two or more layers, the materials of each layer may be the same or different.

In the magnetic recording medium having the above-mentioned configuration, since the internal stresses (tensile stresses) of the first and second reinforcement layers 17 and 18 are cancelled out each other, it is possible to suppress occurrence of cupping in the magnetic recording medium. Therefore, it is possible to maintain the favorable contact state between the magnetic head and the magnetic recording medium, and provide a high SN magnetic recording medium having high dimension stability in the track width direction and excellent off-track characteristics. Further, when the laminate 10 is wound into a roll in the step of producing the magnetic recording medium, since the adhesion suppression layer 19 is interposed between the first and second reinforcement layers 17 and 18, it is possible to suppress metal adhesion of the first and second reinforcement layers 17 and 18.

Modified Example 5

In order to adjust the coercive force Hc of the powder of the ε-iron oxide particles, the ε-iron oxide particles may be made into a core shell, or the ε-iron oxide particles may be caused to contain an additive. As the additive, metal other than iron can be used. For example, one or more selected from the group consisting of Al, Ga, and In can be used. Note that details of the making of ε-iron oxide particles into a core shell will be described in second and third embodiments.

Modified Example 6

The magnetic recording medium may be configured to be capable of recording signals with the shortest recording wavelength of not more than 75 nm by using a recording/reproduction apparatus including a recording head other than a ring-type head.

2 Second Embodiment

A magnetic recording medium according to a second embodiment of the present technology is different from the magnetic recording medium according to the first embodiment in that it includes the recording layer 13 containing a powder of ε-iron oxide particles having a core-shell structure as the magnetic powder. Therefore, only the magnetic powder will be described below.

[Configuration of Magnetic Powder]

Figure 11:
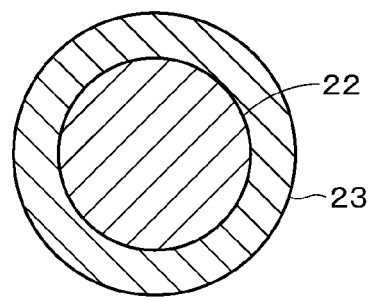
FIG. 11 is a cross-sectional view showing a configuration of a magnetic powder used in a magnetic recording medium according to a second embodiment of the present technology.

The magnetic powder is a powder of ε-iron oxide particles having a core-shell structure. As shown in FIG. 11, the ε-iron oxide particles each include a core portion 22 and a shell portion 23 provided around the core portion 22. The core portion 22 and the shell portion 23 are exchange-coupled. At the interface between the core portion 22 and the shell portion 23, the composition and/or state of the both portions may be varied in a discontinuous manner or in a continuous manner.

(Core Portion)

The core portion 22 is similar to the ε-iron oxide particles in the first embodiment.

(Shell Portion)

The shell portion 23 covers at least a part of the periphery of the core portion 22. Specifically, the shell portion 23 may partially cover the periphery of the core portion 22 or cover the entire periphery of the core portion 22. From the viewpoint of sufficient exchange-coupling between the core portion 22 and the shell portion 23 and improvement of magnetic properties, it is favorable to cover the entire surface of the core portion 22.

The shell portion 23 is a so-called soft magnetic layer, and contains α-Fe that is a soft magnetic material. The shell portion 23 can be obtained by, for example, reducing the surfaces of ε-iron oxide particles (hard magnetic particles) as a precursor of the core-shell particles. Specifically, for example, the α-Fe contained in the shell portion 23 can be obtained by reducing ε-iron oxide contained in the core portion 22. Note that the shell portion 23 may contain another soft magnetic material instead of α-Fe, or may further contain another soft magnetic material together with α-Fe.

[Method of Producing Magnetic Powder]

Figure 12:
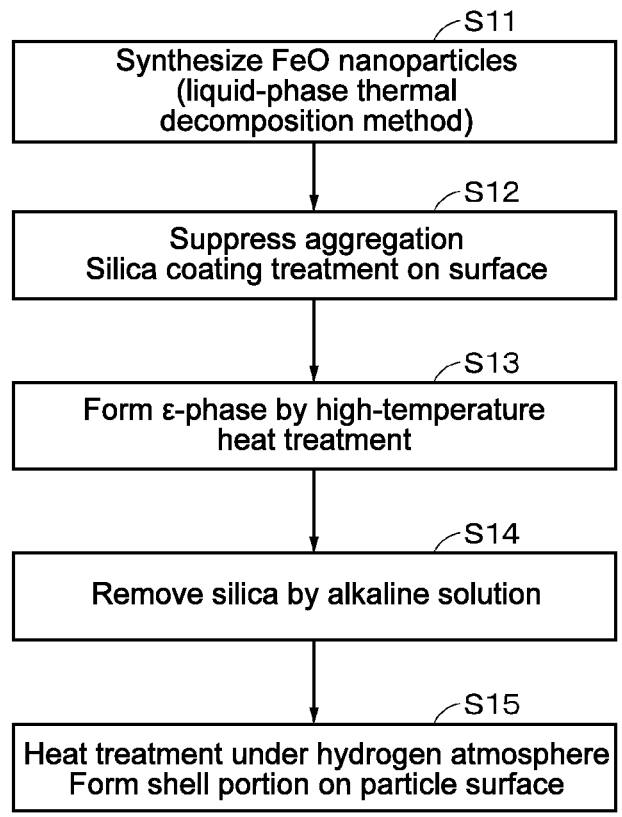
FIG. 12 is a process chart for describing a method of producing the magnetic powder used in the magnetic recording medium according to the second embodiment of the present technology.

A method of producing the magnetic powder according to the second embodiment is different from the method of producing the magnetic powder according to the first embodiment in that the following reduction treatment step (Step S15) after the coating removal step (Step S14) is further included as shown in FIG. 12.

(Reduction Treatment)

In Step S15, reduction treatment is performed on the powder of the ε-iron oxide particles 21 (see Part C of FIG. 7 and Part D of FIG. 7) obtained by removing the silica coated layer 21b. Specifically, by performing heat treatment on the powder of the ε-iron oxide particles 21 under a high-temperature hydrogen atmosphere for a certain time period, the surfaces of the particles are reduced. Accordingly, the shell portion 23 containing α-Fe is formed around the core portion 22. In this way, a target powder of ε-iron oxide particles having a core-shell structure is obtained.

[Effect]

In the magnetic recording medium according to the second embodiment, the recording layer 13 contains a powder of the ε-iron oxide particles having a core-shell structure, which includes the core portion 22 containing ε-iron oxide and the shell portion 23 containing α-Fe that is a soft magnetic material. Therefore, it is possible to realize a magnetic recording medium having high output, excellent thermal stability, and recordability.

In the method of producing the magnetic powder according to the second embodiment, by performing reduction treatment on ε-iron oxide particles that are hard magnetic particles, the core-shell particles that include the shell portion 23 containing α-Fe that is a soft magnetic material are formed. Accordingly, it is possible to prepare uniform core-shell particles, and cause the exchange interaction between ε-iron oxide particles to be the core portion 22 and α-Fe to be the shell portion 23 to uniformly occur. Therefore, it is possible to take advantage of the characteristics of the soft magnetic material having a high saturation magnetization amount σs, and achieve the high saturation magnetization amount σs as the whole core-shell particles. Similarly for the recordability, the coercive force Hc of the whole core-shell particles can be adjusted to the coercive force Hc suitable for recording while keeping the coercive force Hc of the core portion 22 alone to a large value in order to ensure the thermal stability, thereby making it possible to increase the recordability. Further, since also the ε-iron oxide particles to be the core portion 22 can be made larger than those produced by existing methods, it is easy to maintain a high coercive force Hc, which is advantageous for improving the thermal stability.

Further, in the method of producing the magnetic powder according to the second embodiment, since reduction treatment is directly performed on the surfaces of ε-iron oxide particles prepared in advance, the particle diameter of the ε-iron oxide particles to be a precursor and the particle diameter of the core-shell particles obtained by the reduction treatment are substantially the same. Therefore, by adjusting the particle diameter of the ε-iron oxide particles to be a precursor, it is possible to prepare the core-shell particles having a desired particle diameter. Therefore, it is possible to suppress occurrence of variation in particle size distribution.

Modified Example

Modified Example 1

Reduction treatment may be performed on the powder of the ε-iron oxide particles 21 with calcium hydride ($CaH_2$). $CaH_2$ is known to have very strong reducibility. Therefore, it can be used as an alternative to $H_2$ when reducing the powder of the ε-iron oxide particles 21 to form α-Fe. Since $CaH_2$ has very strong reducibility, reduction at a lower temperature than that of $H_2$ can be performed. Further, it is also possible to suppress the aggregation of the ε-iron oxide particles 21 during reduction.

Modified Example 2

The method of producing the powder of the ε-iron oxide particles having a core-shell structure is not particularly limited to the above-mentioned example. For example, in the method of producing the magnetic powder according to Modified Example 1 of the first embodiment, a powder of ε-iron oxide particles having a core-shell structure may be prepared by further providing the above-mentioned reduction treatment step (Step S15) after the coating removal step (Step S25).

3 Third Embodiment

A magnetic recording medium according to a third embodiment of the present technology is different from the magnetic recording medium according to the first embodiment in that it includes the recording layer 13 containing a powder of ε-iron oxide particles having a core-shell structure as the magnetic powder. Therefore, only the magnetic powder will be described below.

[Configuration of Magnetic Powder]

Figure 13:
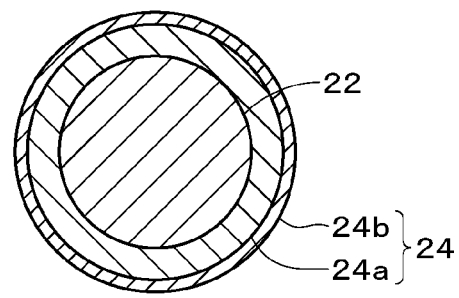
FIG. 13 is a cross-sectional view showing a configuration of a magnetic powder used in a magnetic recording medium according to a third embodiment of the present technology.

A magnetic powder is a powder of core-shell particles including the core portion 22 and a shell portion 24 that is provided around the core portion 22 and has a two-layer structure as shown in FIG. 13.

(Shell Portion)

The shell portion 24 having a two-layer structure includes a first shell portion 24a provided on the core portion 22, and a second shell portion 24b provided on the first shell portion 24a.

(First Shell Portion)

The first shell portion 24a that is a soft magnetic layer is similar to the shell portion 24 in the second embodiment.

(Second Shell Portion)

The second shell portion 24b is an oxide coating film as an oxidation prevention layer. The second shell portion 24b contains a material that can be obtained by oxidizing α-Fe (soft magnetic material) contained in the first shell portion 24a, e.g., at least one iron oxide of $Fe_3O_4$, $Fe_2O_3$, and FeO.

[Method of Producing Magnetic Powder]

Figure 14:
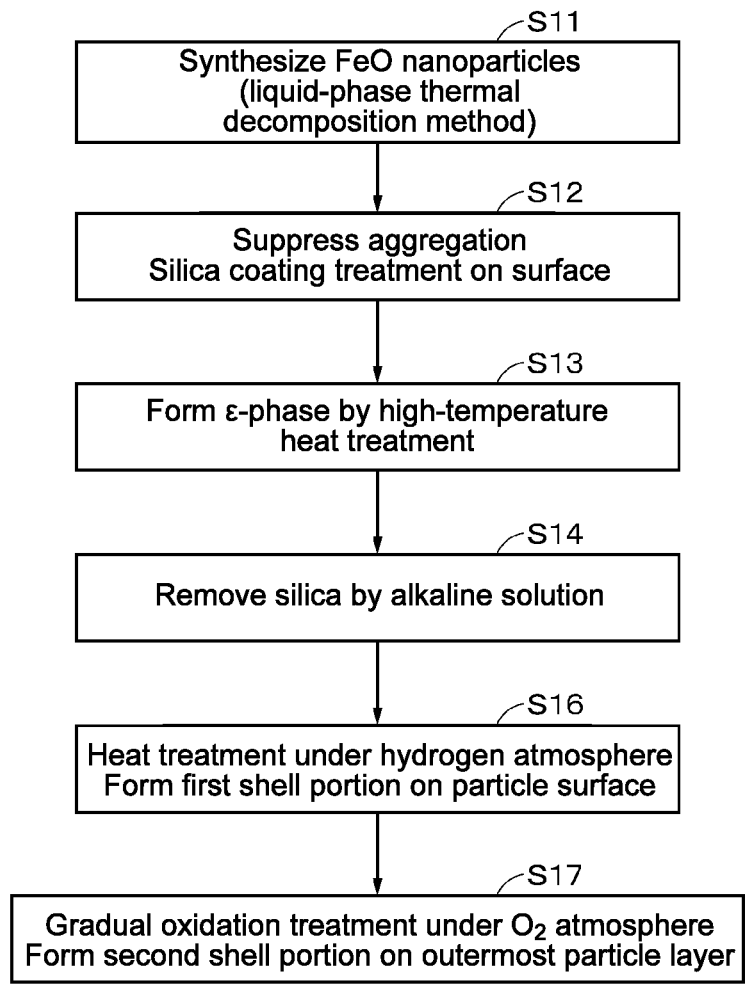
FIG. 14 is a process chart for describing a method of producing the magnetic powder used in the magnetic recording medium according to the third embodiment of the present technology.

A method of producing the magnetic powder according to the third embodiment of the present technology is different from the method of producing the magnetic powder according to the first embodiment in that the following steps of reduction treatment step (Step S16) and gradual oxidation treatment step (Step S17) are further included after the coating removal step (Step S14) as shown in FIG. 14.

(Reduction Treatment)

In Step S16, reduction treatment is performed on the powder of the ε-iron oxide particles 21 (see Part C of FIG. 7, Part D of FIG. 7) obtained by removing the silica coated layer 21b. Accordingly, the first shell portion 24a containing α-Fe is formed around the core portion 22. Note that the reduction treatment in Step S16 is similar to the reduction treatment in Step S15 in the second embodiment.

(Gradual Oxidation Treatment)

In Step S17, gradual oxidation treatment is performed on the powder of the ε-iron oxide particles 21 whose surfaces are covered by the first shell portion 24a. Specifically, for example, after cooling the above-mentioned powder of the ε-iron oxide particles 21 to room temperature in a nitrogen atmosphere, heat treatment is performed thereon in an atmosphere of $O_2+N_2$ mixed gas to form the second shell portion 24b as an oxide coating film on the outermost layer. Accordingly, it is possible to obtain a powder of core-shell ε-iron oxide particles having excellent oxidation resistance.

[Effect]

In the magnetic recording medium according to the third embodiment, the recording layer 13 contains a powder of ε-iron oxide particles having a core-shell structure, which includes the core portion 22 and the shell portion 24 that is provided around the core portion 22 and has a two-layer structure. Therefore, during or before the step of producing the magnetic recording medium, it is possible to prevent the ε-iron oxide particles from being exposed to air to cause rust and the like on the surfaces of the particles to occur. Therefore, it is possible to suppress the deterioration of characteristics of the magnetic recording medium.

Modified Example

The method of producing the powder of ε-iron oxide particles having a core-shell structure is not limited to the above-mentioned example. For example, in the method of producing the magnetic powder according to Modified Example 1 of the first embodiment, a powder of ε-iron oxide particles having a core-shell structure may be prepared by further providing the above-mentioned reduction treatment step (Step S16) and gradual oxidation treatment step (Step S17) after the coating removal step (Step S25).

Example

Hereinafter, the present technology will be specifically described by way of Examples. However, the present technology is not limited to only these Examples.

In the following Examples and Comparative Examples, $D_{max}$, $D_{min}$, $D_{max}/D_{min}$, $\delta_{mag}$, and $\delta_{mag}/D_{min}$ of the ε-$Fe_2O_3$ crystal magnetic powder having a substantially spherical shape or substantially cubic shape and the recording layer containing it are obtained by the above-mentioned method described in the first embodiment.

In the following Comparative Examples, $D_{max}$, $T_{max}$, $D_{max}/T_{max}$, $\delta_{mag}$, $\delta_{mag}/T_{max}$ of a $BaFe_{12}O_{19}$ crystal magnetic powder having a substantially hexagonal plate-like shape and the recording layer containing it are obtained as follows.

($D_{max}$, $T_{max}$, $D_{max}/T_{max}$)

First, a TEM image of a $BaFe_{12}O_{19}$ crystal magnetic powder is acquired. Next, 500 particles from which the main surface having a substantially hexagonal shape can be observed are randomly selected from the acquired TEM image, and the longest diameter $d_{max}$ of each of the particles is measured to obtain the particle size distribution of the longest diameter $d_{max}$ of the magnetic powder. Here, the "longest diameter $d_{max}$ of the particles" means the so-called maximum Feret diameter, and specifically represents the largest distance between two parallel lines drawn from any angle so as to be in contact with the outline of the main surface having a hexagonal shape. After that, the median diameter (50% diameter, D50) of the longest diameter $d_{max}$ from the obtained particle size distribution of the longest diameter $d_{max}$, and this is taken as the average longest diameter $D_{max}$ of the magnetic powder.

Next, 500 magnetic particles from which the side surface can be observed are randomly selected from the above-mentioned TEM image, and the maximum thickness $t_{max}$ of each of the particles is measured to obtain the particle size distribution of the maximum thickness $t_{max}$ of the magnetic powder. After that, the median diameter (50% diameter, D50) of the maximum thickness $t_{max}$ is obtained from the obtained particle size distribution of the maximum thickness $t_{max}$, and this is taken as an average maximum thickness $T_{max}$ of the magnetic powder. Finally a ratio ($D_{max}/T_{max}$) is obtained by using the average longest diameter $D_{max}$ and average maximum thickness $T_{max}$ obtained as described above.

($\delta_{mag}$)

The average thickness $\delta_{mag}$ of the recording layer is obtained by the above-mentioned method described in the first embodiment.

($\delta_{mag}/T_{max}$)

A ratio ($\delta_{mag}/T_{max}$) is obtained by using the average thickness $\delta_{mag}$ of the recording layer and the average maximum thickness $T_{max}$ of the magnetic powder obtained as described above.

Examples 1 to 4

<Step of Preparing Magnetic Powder>

An ε-$Fe_2O_3$ crystal magnetic powder that has a substantially spherical shape and has $D_{max}$, $D_{min}$, and $D_{max}/D_{min}$ shown in Table 1 was prepared by using a powder of $Fe_3O_4$ particles as a starting raw material as follows.

(Synthesis of $Fe_3O_4$ Nanoparticles)

First, 20 mmol to 60 mmol of iron acetylacetonate, 20.0 mL of oleic acid, and 30.0 mL of oleylamine were weighed in a 300 ml round-bottomed three-necked flask and mixed to prepare a solution. Next, degassing treatment was performed by heating the solution at 130° C. for one hour under a reduced pressure atmosphere of 100 Pa. Note that the values of $D_{max}$, $D_{min}$, and $D_{max}/D_{min}$ of the ε-$Fe_2O_3$ crystal magnetic powder were changed for each sample by adjusting the blending amount of iron acetylacetonate in the above-mentioned range.

Subsequently, the atmosphere was switched to an $N_2$ atmosphere, the temperature was increased to 300° C., and heating was performed for six hours. After that, it was naturally cooled to room temperature, and centrifuged and washed a plurality of times with ethanol to obtain $Fe_3O_4$ nanoparticles as precursor particles. Finally, the obtained $Fe_3O_4$ nanoparticles were redispersed in cyclohexane.

(Silica Coating Treatment)

First, 80 mL of cyclohexane, 12 mL of polyoxyethylene (5) nonylphenyl ether (IGEPAL (registered trademark)), and 2 mL of aqueous ammonia were mixed in a 100 ml eggplant flask, and stirred at 600 rpm for 60 min while applying ultrasonic waves until a transparent uniform solution was obtained.

The $Fe_3O_4$ nanoparticles previously dispersed in cyclohexane were added thereto, and tetraethylorthosilicate was added dropwise at an arbitrary rate so that the molar ratio of Fe/Si was 0.1. After the dropwise addition, stirring was further continued at 600 rpm for 16 hours. After completion of the reaction, the work of adding methanol and performing centrifugation was repeated a plurality of times to perform washing. The precipitate obtained by the centrifugation was dried in a dryer at 60° C., and silica coated $Fe_3O_4$ nanoparticles were collected.

(High-Temperature Heat Treatment)

First, the obtained silica coated $Fe_3O_4$ nanoparticles were put in an alumina crucible and, the crucible was placed in a muffle furnace. After that, the muffle furnace was heated to 1100° C., and firing was performed for 200 hours. As a result, a powder of ε-iron oxide nanoparticles in a substantially single phase was obtained.

(Silica Coating Removal)

First, a powder of the ε-iron oxide nanoparticles and an aqueous NaOH solution adjusted to 5 M were put in a Teflon centrifuge tube, heated to 60° C. by an oil bath, and left to stand for 24 hours. After that, the work of adding ion exchange water and performing centrifugation was repeated a plurality of times. Further, ethanol was added thereto, and it was centrifuged and then dried at 60° C. to obtain a powder of ε-iron oxide nanoparticles from which silica coating had been removed.

<Step of Preparing Magnetic Recording Medium>

(Step of Preparing Coating Material for Forming Recording Layer)

A coating material for forming a recording layer was prepared as follows. First, a first composition having the following formulation was kneaded by an extruder. Next, the first composition and a second composition having the following formulation were added to a stirring tank including a dispersion device, and, premixed. After that, further sand mill mixing was performed, and filter treatment was performed to prepare a coating material for forming a recording layer.

(First Composition)

ε-$Fe_2O_3$ crystal magnetic powder: 100 parts by mass
(Note that as the ε-$Fe_2O_3$ crystal magnetic powder, those obtained by the above-mentioned step of preparing the magnetic powder were used)

Vinyl chloride resin (Cyclohexanone solution 30 mass %): 10 parts by mass
(Degree of polymerization 300, Mn=10000, containing $OSO_3K$=0.07 mmol/g and secondary OH=0.3 mmol/g as polar groups)

Aluminum oxide powder: 5 parts by mass
(α-$Al_2O_3$, average particle diameter 0.2 μm)

Carbon black: 2 parts by mass
(Manufactured by TOKAI CARBON CO., LTD., trade name: SEAST TA)

(Second Composition)

Vinyl chloride resin: 1.1 parts by mass
(Resin solution: resin content 30 mass %, cyclohexanone 70 mass %)

n-butyl stearate: 2 parts by mass
Methyl ethyl ketone: 121.3 parts by mass
Toluene: 121.3 parts by mass
Cyclohexanone: 60.7 parts by mass (Step of Preparing Coating Material for Forming Underlayer)

The coating material for forming an underlayer was prepared as follows. First, a third composition having the following formulation was kneaded by an extruder. After that, the third composition and a fourth composition having the following formulation were added to a stirring tank including a dispersion device, and premixed. After that, further sand mill mixing was performed, and filter treatment was performed to prepare a coating material for forming an underlayer.

(Third Composition)

Acicular iron oxide powder: 100 parts by mass
(α-$Fe_2O_3$, average major axis length 0.15 μm)

Vinyl chloride resin: 55.6 parts by mass
(Resin solution: resin content 30 mass %, cyclohexanone 70 mass %)

Carbon black: 10 parts by mass
(Average particle diameter 20 nm)

(Fourth Composition)

Polyurethane resin UR 8200 (manufactured by TOYOBO CO., LTD.): 18.5 parts by mass
n-butyl stearate: 2 parts by mass
Methyl ethyl ketone: 108.2 parts by mass
Toluene: 108.2 parts by mass
Cyclohexanone: 18.5 parts by mass (Step of Preparing Coating Material for Forming Backcoat Layer)

A coating material for forming a backcoat layer was prepared as follows. First, the following raw materials were mixed in a stirring tank including a dispersion device, and filter treatment was performed to prepare the coating material for forming a backcoat layer.

Carbon black (manufactured by ASAHI CARBON CO., LTD, trade name: #80): 100 parts by mass
Polyester polyurethane: 100 parts by mass
(Manufactured by Nippon Polyurethane Industry Co., Ltd., trade name: N-2304)

Methyl ethyl ketone: 500 parts by mass
Toluene: 400 parts by mass
Cyclohexanone: 100 parts by mass Next, polyisocyanate (trade name: CORONATE L, manufactured by Nippon Polyurethane Industry Co., Ltd.): 4 parts by mass and myristic acid: 2 parts by mass were added, as curing agents, to each of the coating material for forming a recording layer and coating material for forming an underlayer prepared as described above.

(Coating Step)

An underlayer and a recording layer were formed on a polyethylene naphthalate film (PEN film) having a thickness of 6.2 μm as a nonmagnetic supporting body by using the coating material prepared as described above as follows. First, the coating material for forming an underlayer was coated on the PEN film and dried to form an underlayer on the PEN film. Next, the coating material for forming a recording layer was coated on the underlayer and dried to form a recording layer on the underlayer. Note that the magnetic field of the magnetic powder was oriented in the thickness direction of the PEN film during drying by, for example, a solenoid coil. Subsequently, calendaring treatment was performed on the PEN film on which the underlayer and the recording layer were formed to smooth the surface of the recording layer. By adjusting the coating thickness of the coating material for forming an underlayer, the coating thickness of the coating material for forming a recording layer, and the pressure of calendaring treatment in the above-mentioned preparation step, after the calendaring treatment, the average thickness of the underlayer was set to 1100 nm, and the average thickness $\delta_{mag}$ and $\delta_{mag}/D_{min}$ of the recording layer were set to values shown in Table 1. Further, by adjusting the air volume of drying air in the oriented magnetic field, the squareness ratio S (%) (=(Mr/Ms)×100) measured in the travelling direction (longitudinal direction) of the magnetic tape was adjusted for each sample as shown in Table 1. After that, the coating material for forming a backcoat layer was coated on the surface opposite to the recording layer to have a film thickness of 0.6 μm and dried to form a backcoat layer.

(Cutting Step)

The PEN film on which the underlayer, the recording layer, and the backcoat layer were formed as described above was cut to a width of ½ inch (12.65 mm) to obtain a target magnetic tape.

Example 5

<Step of Preparing Magnetic Powder>

By using a powder of FeO particles as a starting raw material, an $\varepsilon$-Fe$_2$O$_3$ crystal magnetic powder that has a substantially cubic shape and $D_{max}$, $D_{min}$, and $D_{max}/D_{min}$ shown in Table 1 was prepared. Specifically, the $\varepsilon$-Fe$_2$O$_3$ crystal magnetic powder was prepared in the same way as that in Example 1 except that the following step of synthesis of FeO particles was performed instead of the step of synthesis of Fe$_3$O$_4$ nanoparticles.

(Synthesis of FeO Nanoparticles)

First, 10 mmol of iron acetylacetonate, 25.0 mL of oleic acid, and 25.0 mL of oleylamine were weighed in a 300 ml round-bottomed three-necked flask and pretreated by heating at 210° C. for 32 hours under a reduced pressure atmosphere of 100 Pa.

Next, the atmosphere was switched to an N$_2$ atmosphere, the temperature was increased to 320° C., and heating was performed for 30 min. After that, it was naturally cooled to room temperature, and centrifuged and washed a plurality of times with ethanol to obtain FeO nanoparticles. Finally, the obtained FeO nanoparticles were redispersed in cyclohexane.

<Step of Preparing Magnetic Recording Medium>

A magnetic tape was obtained in the same way as that in Example 1 except that the $\varepsilon$-Fe$_2$O$_3$ crystal magnetic powder obtained as described above was used as a magnetic powder and the average thickness $\delta_{mag}$ and $\delta_{mag}/D_{min}$ of the recording layer was set to the values shown in Table 1.

Example 6

A magnetic tape was obtained in the same way as that in Example 1 except that reduction treatment was performed on the particle surface of the $\varepsilon$-Fe$_2$O$_3$ crystal magnetic powder as follows to obtain a powder of core-shell $\varepsilon$-iron oxide nanoparticles including a shell portion having a single layer structure.

(Reduction Treatment)

First, a $\varepsilon$-Fe$_2$O$_3$ crystal magnetic powder was placed on a quartz port, and put in a tubular furnace. After putting, the atmosphere of the tubular furnace was replaced with an N$_2$ atmosphere once, and then, the temperature was increased to a predetermined temperature. After the temperature increase, heat treatment was performed at 350° C. for 1 hour while flowing 100% H$_2$ at the flow rate of 100 ml/min. As a result, the surfaces of the $\varepsilon$-iron oxide nanoparticles were reduced and transformed into $\alpha$-Fe. After that, the atmosphere was replaced with an N$_2$ atmosphere again, and it was cooled to room temperature. Accordingly, a core-shell $\varepsilon$-Fe$_2$O$_3$ crystal magnetic powder including an $\alpha$-Fe layer on the surface was obtained.

Example 7

A magnetic tape was obtained in the same way as that in Example 6 except that gradual oxidation treatment was performed on the surface of the $\alpha$-Fe layer as follows to obtain a core-shell $\varepsilon$-Fe$_2$O$_3$ crystal magnetic powder including a shell portion, which has a two-layer structure.

(Gradual Oxidation Treatment)

After cooling it to room temperature in the step of reduction treatment in Example 6, it was further heated to a predetermined temperature, and heat treatment was performed at 300° C. for 5 minutes while flowing N$_2$ gas containing trace oxygen at the same flow rate. After that, the atmosphere was replaced with an N$_2$ atmosphere again, and it was cooled to room temperature. Accordingly, a core-shell $\varepsilon$-Fe$_2$O$_3$ crystal magnetic powder including an oxidation resistant coating film (outer layer) and the $\alpha$-Fe layer (inner layer) was obtained.

Example 8

First, an $\varepsilon$-Fe$_2$O$_3$ crystal magnetic powder having $D_{max}$, $D_{min}$, and $D_{max}/D_{min}$ shown in Table 1 was obtained in the same way as that in Example 5 except that the particle diameter of FeO particles as precursor particles was increased by setting the pretreatment by heating to 30 hours. Next, by performing reduction treatment and gradual oxidation treatment similar to those in Example 7 on the particle surface of the obtained $\varepsilon$-Fe$_2$O$_3$ crystal magnetic powder, a core-shell $\varepsilon$-Fe$_2$O$_3$ crystal magnetic powder was obtained. A magnetic tape was obtained in the same way as that in Example 1 except that the $\varepsilon$-Fe$_2$O$_3$ crystal magnetic powder obtained in this way was used.

Comparative Example 1

A magnetic tape was obtained in the same way as that in Example 1 except that the air volume of drying air in the oriented magnetic field at the time of forming the recording layer was changed and the vertical orientation of the $\varepsilon$-Fe$_2$O$_3$ crystal magnetic powder was reduced (i.e., the squareness ratio in the longitudinal direction (travelling direction) was increased).

Comparative Example 2

A magnetic tape was obtained in the same way as that in Example 1 except that the average thickness $\delta_{mag}$, and $\delta_{mag}/D_{min}$ of the recording layer were set to the values shown in Table 1 by adjusting the coating thickness of the coating material for forming a recording layer and the pressure of the calendaring treatment, Comparative Examples 3 and 4

A magnetic tape was obtained in the same way as that in Example 1 except that a BaFe$_{12}$O$_{19}$ crystal magnetic powder having a hexagonal plate-like shape and $D_{max}$, $T_{max}$, and $D_{max}/T_{max}$ shown in Table 2 was used as a magnetic powder.

[Evaluation of Magnetic Tape]

(Squareness Ratio $S(=(Mr/Ms)\times100)$, Activation Volume $V_{act}$)

The squareness ratio $S=((Mr/Ms)\times100)$ and the activation volume $V_{act}$ of each of the magnetic tapes according to Examples 1 to 8 and Comparative Examples 1 to 4 obtained as described above were obtained by the above-mentioned method described in the first embodiment.

(C/N Value)

The C/N value (electromagnetic conversion characteristics) of each of the magnetic tapes according to Examples 1 to 8 and Comparative Examples 1 to 4 obtained as described above was measured as follows. The C/N was measured at a tape speed of 1.5 m/sec by using a loop tester manufactured by MicroPhysics, Inc. A ring head was used as a recording head. The recording frequency was set to 10 MHz (recording wavelength 0.15 μm), recording/reproduction was performed with the optimum recording current, the reproduction output value of 10 MHz and the average value of noise of 10 MHz±1 MHz were measured using a spectrum analyzer, and the difference between them was defined as the C/N value. In Table 2, the C/N value of Comparative Example 3 is set to 0 dB, and the relative differences thereto are shown. Note that the relative difference of not less than 3 dB was defined as favorable C/N value. Here, the recording wavelength was set to 0.15 μm (150 nm) instead of 75 nm for the following reason. That is, in a recording/reproduction system using a short wavelength, in general, the output/noise ratio at the time of performing recording/reproduction with the recording wavelength twice the shortest recording wavelength is used as C/N in many cases. Further, the C/N at the double recording wavelength has a higher correlation with the error rate than the C/N at the shortest recording wavelength. Further, in the case where C/N measurement was performed with the shortest recording wavelength, tape noise is hidden by the system noise of the recording/reproduction system depending on the wavelength characteristics of the recording/reproduction system, and the noise characteristics of the medium is not correctly reflected in some cases. In particular, in the case of recording with high linear recording density, the noise characteristics of the medium is not correctly reflected in many cases.

[Result]

Table 1 shows the configuration and evaluation results of the magnetic tapes according to Examples 1 to 8 and Comparative Examples 1 and 2.

However, in Tables 1 and 2, Mr is residual magnetization, Ms is saturation magnetization, $D_{max}$ is an average longest diameter, $D_{min}$ is an average shortest diameter, $T_{max}$ is an average maximum thickness, $\delta_{mag}$ is an average thickness of the recording layer, $V_{act}$ is an activation volume, and C/N is a Carrier to Noise Ratio. Note that the squareness ratio Mr/Ms was measured in the travelling direction (longitudinal direction) of the magnetic tape, and is indicated in percentage.

From Table 1 and Table 2, the following can be seen.

In Examples 1 to 8, since the recording layer contains the ε-$Fe_2O_3$ crystal magnetic powder, the squareness ratio measured in the travelling direction of the magnetic tape is not more than 30%, the ratio ($D_{max}/D_{min}$) of the average longest diameter $D_{max}$ of the ε-$Fe_2O_3$ crystal magnetic powder to the average shortest diameter $D_{min}$ satisfies the relationship of $1.0 \leq (D_{max}/D_{min}) \leq 1.1$, the average thickness $\delta_{mag}$ of the recording layer is not more than 100 nm, and the ($\delta_{mag}/D_{min}$) of the average thickness $\delta_{mag}$ of the recording layer to the

TABLE 1

| | Magnetic powder | Soft magnetic shell | Outermost layer oxide film | Mr/Ms (Longitudinal measurement) (%) | Dmax (nm) | Dmin (nm) | Dmax/Dmin | δmag (nm) | δmag/Dmin | Particle shape | Vact (nm³) | C/N (dB) |
|---|---|---|---|---|---|---|---|---|---|---|---|---|
| Example 1 | ε-$Fe_2O_3$ | No | No | 27 | 20 | 19 | 1.05 | 80 | 4.2 | Substantially spherical | 4950 | 3.8 |
| Example 2 | ε-$Fe_2O_3$ | No | No | 30 | 20 | 19 | 1.05 | 80 | 4.2 | Substantially spherical | 4950 | 3.2 |
| Example 3 | ε-$Fe_2O_3$ | No | No | 22 | 16 | 15.5 | 1.03 | 70 | 4.5 | Substantially spherical | 2500 | 5.2 |
| Example 4 | ε-$Fe_2O_3$ | No | No | 27 | 20 | 19 | 1.05 | 95 | 5 | Substantially spherical | 4950 | 3.4 |
| Example 5 | ε-$Fe_2O_3$ | No | No | 27 | 24 | 23.8 | 1.01 | 95 | 4 | Substantially cubic | 7500 | 3.1 |
| Example 6 | ε-$Fe_2O_3$ | α-Fe | No | 27 | 20 | 19 | 1.05 | 80 | 4.2 | Substantially spherical | 5200 | 4 |
| Example 7 | ε-$Fe_2O_3$ | α-Fe | With | 27 | 20 | 19 | 1.05 | 80 | 4.2 | Substantially spherical | 4200 | 4.2 |
| Example 8 | ε-$Fe_2O_3$ | α-Fe | With | 27 | 25 | 24 | 1.04 | 80 | 3.3 | Substantially cubic | 4900 | 3.2 |
| Comparative Example 1 | ε-$Fe_2O_3$ | No | No | 33 | 20 | 19 | 1.05 | 80 | 4.2 | Substantially spherical | 4950 | 2.8 |
| Comparative Example 2 | ε-$Fe_2O_3$ | No | No | 27 | 20 | 19 | 1.05 | 120 | 6.3 | Substantially spherical | 4950 | 2.5 |

Table 2 shows the configuration and evaluation results of the magnetic tapes according to Comparative Examples 3 and 4.

average shortest diameter $D_{min}$ of the ε-$Fe_2O_3$ crystal magnetic powder satisfies the relationship of $\delta_{mag}/D_{min} \leq 5$, a favorable C/N value is obtained.

TABLE 2

| | Magnetic powder | Soft magnetic shell | Outermost layer oxide film | Mr/Ms (Longitudinal measurement) (%) | Dmax (nm) | Tmax (nm) | Dmax/Tmax | δmag (nm) | δmag/Tmax | Particle shape | Vact (nm³) | C/N (dB) |
|---|---|---|---|---|---|---|---|---|---|---|---|---|
| Comparative Example 3 | $BaFe_{12}O_{19}$ | No | No | 33 | 30 | 8 | 3.75 | 80 | 10 | Plate-like | 12000 | 0 |
| Comparative Example 4 | $BaFe_{12}O_{19}$ | No | No | 29 | 22 | 7 | 3.14 | 80 | 11.4 | Plate-like | 9000 | 2.2 |

In Comparative Example 1, since the squareness ratio measured in the travelling direction of the magnetic tape exceeds 30% and the vertical orientation of the magnetic powder is low, the C/N value is reduced.

In Comparative Example 2, since the average thickness $\delta_{mag}$ of the recording layer exceeds 100 nm and the perpendicular magnetic field is hard to reach the lower part of the recording layer, the C/N value is reduced.

In Comparative Examples 3 and 4, since the $BaFe_{12}O_{19}$ crystal magnetic powder having a hexagonal plate-like shape, which is easily stacked, is used as a magnetic powder, the C/N value is reduced. In Comparative Example 3 in which the average longest diameter $D_{max}$ is large, since stacking is particularly easy to occur, the C/N value is significantly reduced.

Although embodiments and Examples of the present technology have been specifically described above, the present technology is not limited to the above-mentioned embodiments and Examples and various modifications can be made on the basis of the technical idea of the present technology.

For example, the configurations, the methods, the steps, the shapes, the materials, and the numerical values cited in the above-mentioned embodiments and Examples are only illustrative, and different configurations, methods, steps, shapes, materials, and numerical values may be used as necessary. Further, the chemical formulae of compounds and the like are representative, and are not limited to the described valences and the like as long as they are common names of the same compound.

Further, the configurations, the methods, the steps, the shapes, the materials, and the numerical values in the above-mentioned embodiments and Examples can be combined without departing from the essence of the present disclosure.

Further, the present technology may take the following configurations.

(1)

A magnetic recording medium that is used in a recording/reproduction apparatus having a shortest recording wavelength of not more than 75 nm, the magnetic recording medium including:

a recording layer that contains a powder of particles containing ε-iron oxide, wherein a squareness ratio measured in a traveling direction of the magnetic recording medium is not more than 30%, a ratio ($D_{max}/D_{min}$) of an average longest diameter $D_{max}$ of the particles to an average shortest diameter $D_{min}$ of the particles satisfies a relationship of $1.0 \leq (D_{max}/D_{min}) \leq 1.1$, an average thickness $\delta_{mag}$ of the recording layer is not more than 100 nm, and a ratio ($\delta_{mag}/D_{min}$) of the average thickness $\delta_{mag}$ of the recording layer to the average shortest diameter $D_{min}$ of the particles satisfies a relationship of $\delta_{mag}/D_{min} \leq 5$.

(2)

The magnetic recording medium according to (1), in which
each of the particles has a spherical shape or a substantially spherical shape.

(3)

The magnetic recording medium according to (1), in which
each of the particles has a cubic shape or a substantially cubic shape.

(4)

The magnetic recording medium according to any one of (1) to (3), in which
each of the particles has a core-shell structure.

(5)

The magnetic recording medium according to any one of (1) to (4), in which
each of the particles includes
a core portion containing ε-iron oxide, and
a shell portion containing a soft magnetic material.

(6)

The magnetic recording medium according to (5), in which
each of the particles further includes an oxide coating film provided on the shell portion.

(7)

The magnetic recording medium according to any one of (1) to (6), in which
the squareness ratio measured in the traveling direction of the magnetic recording medium is not more than 25%.

(8)

The magnetic recording medium according to any one of (1) to (7), in which
an average thickness $\delta_{mag}$ of the recording layer is not more than 80 nm.

(9)

The magnetic recording medium according to any one of (1) to (8), in which
a ratio ($\delta_{mag}/D_{min}$) of an average thickness $\delta_{mag}$ of the recording layer to an average shortest diameter $D_{min}$ of the particles satisfies a relationship of $\delta_{mag}/D_{min} \leq 4.5$.

(10)

The magnetic recording medium according to any one of (1) to (9), in which
each of the particles further contains metal other than iron.

(11)

The magnetic recording medium according to any one of (1) to (10), in which
an activation volume $V_{act}$ is not more than 5000 nm$^3$.

(12)

The magnetic recording medium according to any one of (1) to (11), in which
an activation volume $V_{act}$ is not more than 3000 nm$^3$.

(13)

The magnetic recording medium according to any one of (1) to (12), in which
the recording/reproduction apparatus includes a ring-type head as a recording head.

(14)

The magnetic recording medium according to any one of (1) to (13), which is perpendicular magnetic recording-type magnetic recording medium.

REFERENCE SIGNS LIST 11 substrate
12 underlayer
13 recording layer
14 backcoat layer
15 reinforcement layer
16 cupping suppression layer
17 first reinforcement layer
18 second reinforcement layer
19 adhesion suppression layer
21 ε-iron oxide particles
21a FeO particles
21b silica coated layer
21c Fe$_3$O$_4$ particles
22 core portion
23, 24 shell portion
24a first shell portion
24b second shell portion

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A magnetic recording medium that is used in a recording/reproduction apparatus having a shortest recording wavelength of not more than 75 nm, the magnetic recording medium comprising:
   a recording layer that contains a powder of particles containing ε-iron oxide, wherein
   a squareness ratio measured in a traveling direction of the magnetic recording medium is not more than 25%,
   a ratio ($D_{max}/D_{min}$) of an average longest diameter $D_{max}$ of the particles to an average shortest diameter $D_{min}$ of the particles satisfies a relationship of $1.0 \leq (D_{max}/D_{min}) \leq 1.1$,
   an average thickness $\delta_{mag}$ of the recording layer is not more than 70 nm, and
   a ratio ($\delta_{mag}/D_{min}$) of the average thickness $\delta_{mag}$ of the recording layer to the average shortest diameter $D_{min}$ of the particles satisfies a relationship of $\delta_{mag}/D_{min} \leq 5$.

2. The magnetic recording medium according to claim 1, wherein
   each of the particles has a spherical shape or a substantially spherical shape.

3. The magnetic recording medium according to claim 1, wherein
   each of the particles has a cubic shape or a substantially cubic shape.

4. The magnetic recording medium according to claim 1, wherein
   each of the particles has a core-shell structure.

5. The magnetic recording medium according to claim 1, wherein
   each of the particles includes
   a core portion containing ε-iron oxide, and
   a shell portion containing a soft magnetic material.

6. The magnetic recording medium according to claim 5, wherein
   each of the particles further includes an oxide coating film provided on the shell portion.

7. The magnetic recording medium according to claim 1, wherein
   a ratio ($\delta_{mag}/D_{min}$) of an average thickness $\delta_{mag}$ of the recording layer to an average shortest diameter $D_{min}$ of the particles satisfies a relationship of $\delta_{mag}/D_{min} \leq 4.5$.

8. The magnetic recording medium according to claim 1, wherein
   each of the particles further contains metal other than iron.

9. The magnetic recording medium according to claim 1, wherein
   an activation volume $V_{act}$ is not more than 5000 nm$^3$.

10. The magnetic recording medium according to claim 1, wherein
    an activation volume $V_{act}$ is not more than 3000 nm$^3$.

11. The magnetic recording medium according to claim 1, wherein
    the recording/reproduction apparatus includes a ring-type head as a recording head.

12. The magnetic recording medium according to claim 1, which is perpendicular magnetic recording-type magnetic recording medium.

* * * * *